(12) United States Patent
Seo et al.

(10) Patent No.: US 11,294,457 B2
(45) Date of Patent: Apr. 5, 2022

(54) DISPLAY APPARATUS AND CONTROLLING METHOD THEREOF

(71) Applicant: SAMSUNG ELECTRONICS CO., LTD., Suwon-si (KR)

(72) Inventors: Chanwon Seo, Suwon-si (KR); Yehoon Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/570,269

(22) Filed: Sep. 13, 2019

(65) Prior Publication Data
US 2020/0166996 A1 May 28, 2020

(30) Foreign Application Priority Data
Nov. 28, 2018 (KR) .................. 10-2018-0149914

(51) Int. Cl.
*G06F 3/01* (2006.01)
*G06K 9/32* (2006.01)

(52) U.S. Cl.
CPC .......... *G06F 3/013* (2013.01); *G06K 9/3233* (2013.01); *G06F 2203/011* (2013.01)

(58) Field of Classification Search
None
See application file for complete search history.

(56) References Cited

U.S. PATENT DOCUMENTS

| 8,577,896 B2 | 11/2013 | Sanders |
| 8,887,095 B2 | 11/2014 | Krishnamurthy et al. |
| 8,903,834 B2 | 12/2014 | Ciancutti et al. |
| 10,003,833 B2 | 6/2018 | McDevitt |
| 10,045,077 B2* | 8/2018 | Dang ..................... G06F 3/017 |
| 2012/0066705 A1* | 3/2012 | Harada .............. H04N 21/4662 725/12 |
| 2015/0067724 A1 | 3/2015 | Johnson et al. |
| 2015/0339539 A1* | 11/2015 | Gu ........................... G06K 9/46 382/190 |
| 2016/0182955 A1* | 6/2016 | Klappert .......... H04N 21/44204 725/14 |
| 2017/0068847 A1 | 3/2017 | el Kaliouby et al. |
| 2017/0188930 A1* | 7/2017 | Lahvis .................. A61B 5/168 |
| 2020/0134084 A1* | 4/2020 | Rakshit ................ G06F 16/285 |

FOREIGN PATENT DOCUMENTS

| JP | 5909472 B2 | 4/2016 |
| KR | 10-2014-0075266 A | 6/2014 |
| KR | 10-2015-0086770 A | 7/2015 |
| KR | 10-2016-0095464 A | 8/2016 |

* cited by examiner

*Primary Examiner* — Lindsay J Uhl
(74) *Attorney, Agent, or Firm* — Sughrue Mion, PLLC

(57) ABSTRACT

A display apparatus and a controlling method thereof. The display apparatus may include: a camera, a display, and a processor, where the processor controls the display to display a content, identifies a user interest object in the content displayed on the display based on a user image captured by the camera, and identifies a user preference for the content based on a degree of similarity between information on emotion of the user interest object and information on user emotion.

20 Claims, 15 Drawing Sheets

| EMOTION OF INTEREST OBJECT | USER EMOTION | SIMILARITY DEGREE |
|---|---|---|
| HAPPINESS | HAPPINESS | 100 |
| HAPPINESS | JOY | 80 |
| HAPPINESS | SADNESS | 10 |
| HAPPINESS | CURIOSITY | 50 |
| SADNESS | SADNESS | 100 |
| SADNESS | SURPRISE | 70 |
| SADNESS | CURIOSITY | 30 |
| FEAR | FEAR | 100 |
| FEAR | SURPRISE | 90 |
| FEAR | JOY | 10 |

<USER GAZE IS FIXED ON
SPECIFIC OBJECT (UMBRELLA)>

FIG. 10

DRAMA :ABC    ANALYZE USER PREFERENCE

| OBJECTS IN CONTENT | APPEARANCE FREQUENCY | SYMPATHY FREQUENCY | SYMPATHY DEGREE | IMMERSION FREQUENCY | IMMERSION DEGREE |
|---|---|---|---|---|---|
| CHARACTER A | 40 | 30 | 0.75 | 35 | 0.88 |
| CHARACTER B | 30 | 6 | 0.20 | 16 | 0.53 |
| CHARACTER C | 10 | 2 | 0.20 | 5 | 0.50 |
| PLACE A | 10 | - | - | 7 | 0.70 |
| PLACE B | 5 | - | - | 2 | 0.40 |
| COSMETIC A | 3 | - | - | 2 | 0.67 |
| SHOES A | 4 | - | - | 2 | 0.50 |
| CLOTHES A | 3 | 3 | 1.00 | 3 | 1.00 |
| CLOTHES B | 4 | - | - | 3 | 0.75 |
| CLOTHES C | 4 | - | - | 4 | 1.00 |
| CHARACTER D | 3 | 0 | 0 | 0 | 0 |
| CHARACTER E | 3 | 0 | 0 | 0 | 0 |

<ANALYZE USER PREFERENCE USING INFORMATION ON ALL OBJECTS>

FIG. 11

DRAMA :ABC    ANALYZE USER PREFERENCE

| OBJECTS IN CONTENT | APPEARANCE FREQUENCY | SYMPATHY FREQUENCY | SYMPATHY DEGREE | IMMERSION FREQUENCY | IMMERSION DEGREE |
|---|---|---|---|---|---|
| CHARACTER A | 40 | 30 | 0.75 | 35 | 0.88 |
| CHARACTER B | 30 | 6 | 0.20 | 16 | 0.53 |
| CHARACTER C | 10 | 2 | 0.20 | 5 | 0.50 |
| PLACE A | 10 | - | - | 7 | 0.70 |
| PLACE B | 5 | - | - | 2 | 0.40 |
| COSMETIC A | 3 | - | - | 2 | 0.67 |
| SHOES A | 4 | - | - | 2 | 0.50 |
| CLOTHES A | 3 | 3 | 1.00 | 3 | 1.00 |
| CLOTHES B | 4 | - | - | 3 | 0.75 |
| CLOTHES C | 4 | - | - | 4 | 1.00 |

<ANALYZE USER PREFERENCE ONLY USING INFORMATION ON OBJECT OF WHICH APPEARANCE FREQUENCY IS EQUAL TO OR GREATER THAN THRESHOLD VALUE (5)>

FIG. 12

DRAMA :ABC   ANALYZE USER PREFERENCE

| OBJECTS IN CONTENT | APPEARANCE FREQUENCY | SYMPATHY FREQUENCY | SYMPATHY DEGREE | IMMERSION FREQUENCY | IMMERSION DEGREE |
|---|---|---|---|---|---|
| CHARACTER A | 40 | 30 | 0.75 | 35 | 0.88 |
| CHARACTER B | 30 | 6 | 0.20 | 16 | 0.53 |
| CHARACTER C | 10 | 2 | 0.20 | 5 | 0.50 |
| PLACE A | 10 | - | - | 7 | 0.70 |
| PLACE B | 5 | - | - | 2 | 0.40 |
| COSMETIC A | 3 | - | - | 2 | 0.67 |
| SHOES A | 4 | - | - | 2 | 0.50 |
| CLOTHES A | 3 | 3 | 1.00 | 3 | 1.00 |
| CLOTHES B | 4 | - | - | 3 | 0.75 |
| CLOTHES C | 4 | - | - | 4 | 1.00 |

<ANALYZE USER PREFERENCE USING INFORMATION ON OBJECT IN WHICH 30, 7 AND 4 ARE RESPECTIVE THRESHOLD VALUES OF APPEARANCE FREQUENCIES OF CHARACTER, PLACE AND THING>

<DIFFERENT THRESHOLD VALUE OF APPEARANCE FREQUENCY FOR EACH OBJECT TYPE>

# DISPLAY APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2018-0149914, filed on Nov. 28, 2018, in the Korean Intellectual Property Office, the disclosure of which is incorporated by reference herein in its entirety.

BACKGROUND OF THE INVENTION

Field of the Invention

The disclosure relates to a display apparatus and a controlling method thereof, and more particularly, to a display apparatus and a controlling method thereof analyzing a user preferred content.

Description of the Related Art

In recent years, there have been various technologies providing user-customized contents; and thus it is possible to provide a user with a recommendation service or a customized advertisement using the user-customized content.

In a conventional user-customized advertisement or service, a user watch history and the like are analyzed to identify a user preference. However, by the user watch history, it is only possible to identify a type of a user preferred content and difficult to determine (or identify) which field of object the user prefers among various objects included in the content.

For example, by a conventional method, it is only possible to identify whether the user preferred content is a sport or drama, or whether a user preferred sport is soccer or basketball. However, it is difficult to identify a user specific preference, e.g. which team or which player in the sport the user favors.

In addition, it is difficult to identify which object the user sympathizes with and is immersed in, among a plurality of objects included in a single content.

SUMMARY OF THE INVENTION

Exemplary embodiments of the disclosure overcome the above disadvantages and other disadvantages not described above. Also, the disclosure is not required to overcome the disadvantages described above, and an exemplary embodiment of the disclosure may not overcome any of the problems described above.

The disclosure provides a display apparatus and a controlling method thereof of recognizing a user interest object and emotion through a user image and then comparing the user interest object (or the interest object) and emotion to each other.

According to an embodiment in the disclosure, a display apparatus may include: a camera; a display; and a processor configured to control the display to display a content; to identify a user interest object in the content displayed on the display based on a user image captured by the camera; and to identify a user preference for the content based on a degree of similarity between information on emotion of the user interest object and information on user emotion.

In addition, the processor may identify the user preference for the user interest object based on the degree of similarity between the information on emotion of the user interest object and the information on user emotion, and may identify the user preference for at least one of the content or a content type corresponding to the content based on the user preference for each of a plurality of the user interest objects.

Here, the processor may identify the content as a plurality of content sections, and the user interest object for each of the plurality of content sections, and may identify the user preference for the content based on the degree of similarity between the information on emotion of the identified user interest object for each content section and the information on user emotion corresponding to the each content section.

The processor may identify the user preference for the content based on a first degree of similarity. For example, the user preference for the content may be identified based on identifying that the information on emotion of the user interest object and the information on user emotion are identical or similar to each other. Also, the processor may identify the user preference for the content based on a second degree of similarity. For example, the user preference for the content may be identified based on identifying that the information on user emotion is a reaction emotion for the information on emotion of the user interest object.

The processor may identify the user interest object in the content displayed on the display based on at least one context of the display apparatus or the user.

The processor may identify a user degree of sympathy for at least one of the content or the user interest object based on the degree of similarity between the information on emotion of the user interest object and the information on user emotion, and may identify the user preference for the content based on the identified user degree of sympathy.

The processor may identify the user interest object in the content displayed on the display based on at least one of the user's gaze information, biometric information or voice information.

The processor may provide supplemental content, which may comprise at least one of advertisement content, recommendation content or summary content based on the user preference for the content.

The processor may identify first and second user interest objects based on first and second users being identified in user images captured by the camera, respectively, and may identify first and second user preferences for the content based on first and second degrees of similarity between information on emotions of the first and second user interest objects and information on first and second user emotions, respectively.

Based on a plurality of user interest objects being identified in the content displayed on the display, the processor may identify additional information on which the user gaze is focused in the content displayed on the display based on the user image, and may identify one of the plurality of user interest objects based on the identified additional information, wherein the additional information may be information on each of the plurality of user interest objects.

According to another embodiment of the disclosure, a controlling method of a display apparatus includes: controlling a display to display a content; identifying a user interest object in the content displayed on the display based on a user image captured by a camera; and identifying a user preference for the content based on a degree of similarity between information on emotion of the user interest object and information on user emotion.

The identifying of the user preference for the content may include: identifying the user preference for the user interest object based on the degree of similarity between the information on emotion of the user interest object and the information on user emotion; and identifying the user preference for at least one of the content or a content type corresponding to the content based on the user preference for each of a plurality of the user interest objects.

The identifying of the user preference for the content may include: identifying the content as a plurality of content sections, and identifying the user interest object for each of the plurality of content sections; and identifying the user preference for the content based on the degree of similarity between the information on emotion of the identified user interest object for each content section and the information on user emotion corresponding to the each content section.

In addition, the identifying of the user preference for the content may include: identifying the user preference for the content based on a first degree of similarity based on identifying that the information on emotion of the user interest object and the information on user emotion are identical or similar to each other; and identifying the user preference for the content based on a second degree of similarity based on identifying that the information on user emotion is a reaction emotion for the information on emotion of the user interest object.

In addition, the identifying of the user interest object in the content may include identifying the user interest object in the content displayed on the display based on at least one context of the display apparatus or the user.

In addition, the identifying of the user preference for the content may include: identifying a user degree of sympathy for at least one of the content or the user interest object based on the degree of similarity between the information on emotion of the user interest object and the information on user emotion; and identifying the user preference for the content based on the identified user degree of sympathy.

In addition, the identifying of the user interest object in the content may include identifying the user interest object in the content displayed on the display based on at least one of the user's gaze information, biometric information or voice information.

Meanwhile, the controlling method of the display apparatus may further include providing supplemental content, which may include at least one of advertisement content, recommendation content or summary content based on the user preference for the content. The providing of the supplemental content may include causing the display to display at least part of the supplemental content or other information regarding the user preference.

In addition, the identifying of the user preference for the content may include: identifying first and second user interest objects, respectively, based on first and second users being identified in user images captured by the camera; and identifying first and second user preferences for the content based on first and second degrees of similarity between information on emotions of the first and second user interest objects and information on first and second user emotions, respectively.

Meanwhile, a non-transitory computer readable medium may store one or more computer instructions that, when executed by a processor of the display apparatus, cause the processor to: control the display to display a content; identify a user interest object in the content displayed on the display based on an image captured by a camera; and identifying a user preference for the content based on a degree of similarity between information on emotion of the user interest object and information on user emotion.

In another embodiment, a display apparatus may comprise: a camera; a display; and a processor. The processor may be configured to: control the camera to capture an image, based on the captured image: recognize an identity of a user, and identify a gazing point of the user, which is a point on the display that the user is gazing at, identify an emotion of the user, and identify a user interest object, which is an object the user is interested in, in the content displayed on the display based on the identified gazing point, and identify a user preference for the content based on a degree of similarity between information on emotion of the identified user interest object and the identified emotion of the user.

The processor of the display apparatus may be further configured to: identify whether the user sympathizes with the identified emotion of the user interest object based on the identified emotion of the user; and based on identifying that the user sympathizes with the identified emotion of the user interest object, identify that the user prefers the user interest object, and add information to a memory that indicates that the user prefers the user interest object.

The processor of the display apparatus may be further configured to: cause a display to display supplemental content based on the identified user preference for the content.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the disclosure will be more apparent by describing certain exemplary embodiments of the disclosure with reference to the accompanying drawings, in which:

FIG. 6 is a diagram for explaining a degree of similarity between emotion of a user interest object and user emotion.

FIG. 10 is a diagram for explaining an operation of a display apparatus to analyze a user preference using information on all objects obtained by the display apparatus.

FIG. 11 is a diagram for explaining an operation of a display apparatus to analyze a user preference based on an object appearance frequency.

FIG. 12 is a diagram for explaining an operation of a display apparatus to analyze a user preference by using a different threshold value depending on an object type.

DETAILED DESCRIPTION OF THE EXEMPLARY EMBODIMENTS

Figure 1:
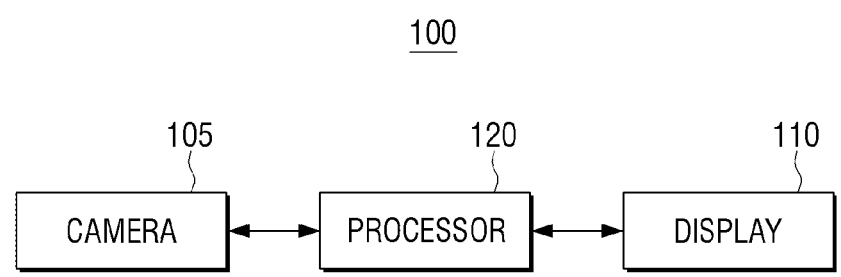
FIG. 1 is a block diagram illustrating a display apparatus according to an embodiment in the disclosure.

Before describing the disclosure in detail, a method of describing the specification and drawings is described.

First, general terms are used in the specification and the claims based on functions thereof in various embodiments in the disclosure. However, such terms may be differently used depending on intentions of a person skilled in the art, a legal or technical interpretation, or an emergence of a new technology. In addition, some terms are arbitrarily selected by the applicant. These terms may be construed in the meaning defined herein and, unless otherwise specified, may be construed on the basis of the entire contents of the specification and common technical knowledge in the art In addition, throughout the accompanying drawings of the specification, the same reference numerals denote parts or components performing substantially the same functions. For convenience of explanation and understanding, different embodiments are described using the same reference numerals or signs. In other words, even though all the elements having the same reference numerals are illustrated in a plurality of drawings, the plural drawings may not refer to the same embodiment.

In the specification and the claims, a term including an ordinal number such as "first", "second" or the like may be used only to distinguish the same or similar components from each other and therefore, each of the components is not limited by the ordinal number. The terms are used to distinguish one component from another component. For example, any component associated with such an ordinal number is not limited in the orders of use, placement, etc. When necessary, each ordinal number may be used interchangeably.

In the specification, singular forms include plural forms unless the context clearly indicates otherwise. It is to be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Because the disclosure may be variously modified and have several embodiments, specific embodiments are shown in the accompanying drawings and described in detail. However, it is to be understood that the disclosure is not limited to the specific embodiments, but includes all modifications, equivalents, and substitutions included in the spirit and the scope in the disclosure. Further, in describing the embodiments, when it is determined that the detailed description of the known art related to the disclosure may obscure the gist in the disclosure, the detailed description thereof is omitted.

In the embodiment in the disclosure, a term such as a "module", a "unit" or a "part" is used to indicate a component performing at least one function or operation, and enabled to be implemented with hardware, software, or a combination of hardware and software. In addition, a plurality of "modules", "units", "parts" or the like may be integrated into at least one module or chip and implemented with at least one processor except for a case in which a "module", a "unit" or a "part" has to be individually implemented with a specific hardware.

In addition, in the specification, it is to be understood that when one component is referred to as being 'connected to' another component, it may be connected directly to another component or be indirectly connected to another component with a third component interposed therebetween. Unless explicitly described otherwise, 'comprising' any components is to be understood to imply the inclusion of other components but not the exclusion of any other components.

FIG. 1 is a block diagram illustrating a display apparatus according to an embodiment in the disclosure.

Referring to FIG. 1, a display apparatus 100 may include: a camera 105; a display 110; and a processor 120.

The display apparatus 100 may be one of various apparatuses each including a display. The display apparatus 100 may be a television (TV), a desktop personal computer (PC), a laptop computer, a smart phone, a tablet PC, a server or the like. Meanwhile, each of these examples is to explain an electronic apparatus, and is not necessarily limited thereto.

The camera 105 may be implemented as a front camera provided on a front surface of the display apparatus 100 and may capture an object in front of the display apparatus 100 to obtain a captured image. The camera 105 may capture an object in front of the camera (e.g., a user face) to obtain an image of the user face. When an object is captured by the camera 105, a captured image of the object may be converted into an electric image signal by a semiconductor optical device, i.e. a charge coupled device (CCD), and the image signal thus converted may be amplified and converted into a digital signal. The digital signal thus converted may be a digital signal processed and converted into the captured image.

The display 110 may be implemented as one of various types of displays such as a liquid crystal display (LCD), an organic light emitting diode (OLED) display, a plasma display panel (PDP) and the like. The display 110 may include a driving circuit, a backlight unit and the like, which may be implemented in a form of a-si thin film transistor (TFT), low temperature poly silicon (LTPS), a thin film transistor (TFT), an organic TFT (OTFT) or the like. Meanwhile, the display 110 may be implemented as a touch screen, a flexible display, a 3 dimensional (3D) display or the like, which is coupled to a touch sensor.

In addition, according to an embodiment in the disclosure, the display 110 may include not only a display panel outputting an image but also a bezel housing the display panel. In particular, according to an embodiment in the disclosure, the bezel may include a touch sensor (not illustrated) for detecting (or sensing) a user interaction.

In addition, the display apparatus 100 may display a content on the display 110.

The processor 120 may control an overall operation of an electronic apparatus. Specifically, the processor may function to control the overall operation of the electronic apparatus.

The processor 120 may be implemented as a digital signal processor (DSP), a microprocessor or a time controller (TCON), for processing a digital image signal. However, the processor 120 is not limited thereto, and may include one or more of a central processing unit (CPU), a micro controller unit (MCU), a micro processing unit (MPU), a controller, an application processor (AP), a communication processor (CP) or an Advanced RISC (reduced instruction set computer) Machines (ARM) processor; alternatively, the processor 120 may be defined by these terms. In addition, the processor 120 may be implemented as a system-on-chip (SoC) or a large scale integration (LSI), which may embed a processing algorithm therein; alternatively, the processor 120 may be implemented in a field programmable gate array (FPGA) form.

The processor 120 may control the display 110 to display a content. In addition, the processor 120 may identify a user interest object in the content displayed on the display 110 based on a user image captured by the camera 105. Thereafter, the processor 120 may identify a user preference for the content based on a degree of similarity between information on emotion of the user interest object and information on user emotion.

The processor 120 may obtain the content through an input/output interface or a communication interface and may control the obtained content to be displayed on the display 110. The processor 120 may identify the user interest object among a plurality of objects included in a content image. Here, the user interest object may refer to an object that is most interesting to the user from among the plurality of objects included in the content image. The user interest object may be a type or a name of a specific object. For example, the user interest object may be identified as at least one of character A, place A, cosmetic A, shoes A or clothes A. Meanwhile, an overall operation for identifying a user preferred content is described below with reference to FIGS. 3, 4 and 5.

In addition, to identifying the user interest object, the processor 120 may track a user gaze. When the user gaze on a specific object continues for a long time, the processor 120 may set the object as the user interest object. Here, the user interest object may be identified by whether or not the user is immersed in the object. Specifically, based on the processor 120 identifying that the user is immersed in the object, the processor 120 may identify (or set) the object as the user interest object.

Meanwhile, the processor 120 may use at least one of user's gaze information, biometric information or voice information to identify whether or not the user is immersed in the object.

The gaze information may be information showing whether or not the user's gaze is fixed on a specific area of the display 110. Specifically, the gaze information may refer to information on whether or not the user gazes at character A in a specific scene. For example, based on the time at which the user gaze is fixed on the specific object being equal to or greater than a threshold value, the processor 120 may determine that the user is immersed in the specific object. The user's gaze may be fixed on the specific subject based on recognizing the pupils of the user's eyes.

The biometric information may refer to the user's biological information. Specifically, the biometric information may include at least one of the user's heart rate (pulse rate), pupil size, pupil movement or body temperature. For example, based on the user gaze being fixed on a specific object and simultaneously, the user heart rate being equal to or greater than the threshold value, the processor 120 may identify that the user is immersed in the specific object.

The voice information may refer to a voice uttered by the user. The processor 120 may obtain a user voice through a microphone included in the display apparatus 100, analyze the user voice signal and then convert the voice signal into text information. When the text information is included in predetermined information, the processor 120 may identify that the user is immersed in an object on which the user gaze is fixed based on the user uttering a voice. For example, the voice information may include an exclamation or a predetermined word. The predetermined word may be a word such as "Poor", "Cool", "Beautiful" or "What is it", which shows the user preference for a specific object. For example, based on the processor 120 recognizing the exclamation of "Wow" in the user voice through the microphone, the processor 120 may identify that the user is immersed in the object on which the user gaze is fixed at the time when the user utters "Wow".

Whether or not the user is immersed in an object may be determined based on whether or not the user gaze is fixed on a specific object among the plurality of objects at a value equal to or greater than the threshold value. For example, five seconds may be assumed as a threshold value of the user gaze fixation. However, a different amount of time may be used instead of five seconds. Based on the user's gaze at a specific object (the user gaze is fixed on the specific object) being for more than a predetermined amount of time (e.g., five seconds), the processor 120 may identify (or set) the object as the user interest object.

Meanwhile, a user degree of immersion on the object may be calculated as an immersion frequency/appearance frequency. According to another embodiment, the degree of immersion may be obtained by various calculation methods based on at least one of the immersion frequency or the appearance frequency.

Here, a degree of similarity may be a numerical value showing how much the emotion of the user interest object and the user emotion are similar to each other. For example, it may be assumed that 0 points refers to a dissimilar emotion case and 100 points refers to the same emotion case. Here, a range from 0 to 100 points may depend on a user set. A detailed description of the degree of similarity is given below with reference to FIG. 6.

Meanwhile, the degree of similarity may have a different criterion depending on a category or genre of the content. For example, when the category of the content is an entertainment, there may be many cases that both characters in the content and the user have emotion of joy (or smile). In this case, the degree of similarity related to the emotion of joy (or smile) may be low. Whereas, when the category of the content is a documentary, there may be few cases that both the characters included in the content and the user have the emotion of joy (or smile). In this case, the degree of similarity related to the emotion of joy (or smile) may be high.

Based on the degree of similarity being equal to or greater than a threshold value (e.g., 70), the processor 120 may identify that the user emotionally sympathizes with a specific object. For example, based on the emotion of the user interest object being happiness and the user emotion corresponds to happiness, the processor 120 may identify that the degree of similarity is 100. Also, when a pre-stored threshold value is 70, the processor 120 may determine that the user interest object has a value (e.g., 100) that is greater than the pre-stored threshold value. Based on this identification, the processor 120 may then identify that the user emotionally sympathizes with the user interest object. That is, the processor 120 may use the degree of similarity to determine a user sympathy frequency.

In addition, the processor 120 may calculate a degree of sympathy using the sympathy frequency/appearance frequency. According to another embodiment, the degree of sympathy may be obtained by various calculation methods based on at least one of the appearance frequency or the sympathy frequency.

In addition, the processor 120 may identify the user preference for the user interest object based on the degree of similarity between the information on emotion of the user interest object and the information on user emotion, and may identify the user preference for at least one of the content or a content type corresponding to the content based on the user preference for each of a plurality of the user interest objects.

The processor 120 may identify the user preference for the content itself based on the user preference for the user interest object and may also identify the user preference for the content type. For example, based on the user being immersed in the user interest object and the degree of similarity between the emotion of the user interest object and the user emotion being high, the processor 120 may identify that the user prefers the content that the user watches. In addition, the processor 120 may identify that the user prefers at least one of the genre or type (e.g., drama or romance drama) of the content that the user watches.

Meanwhile, the processor 120 may identify the user preference for each scene included in the content. In this case, the included scenes may be distinguished from each other using at least one of time, place or character information. For example, the processor 120 may identify the user preference for a sea scene of character A at 600 seconds in episode 10 of drama ABC. In the disclosure, the user preference for the content may be identified based on the user preference for a scene included in the content.

Here, the processor 120 may identify the content as a plurality of content sections, and the user interest object for each of the plurality of content sections, and may identify the user preference for the content based on the degree of similarity between the information on emotion of the identified user interest object for each content section and the information on user emotion corresponding to the each content section.

The processor 120 may divide the content into a plurality of sections to conveniently analyze the user preference. The plurality of sections may have the same time and may be divided into scenes depending on a story. The processor 120 may set the user interest object representing the plurality of sections divided in a single content. A detailed description is given below with reference to FIG. 7.

In addition, the processor 120 may identify the user preference for the content based on a first degree of similarity based on identifying that the information on emotion of the user interest object and the information on user emotion are identical or similar to each other, and may identify the user preference for the content based on a second degree of similarity based on identifying that the information on user emotion is a reaction emotion (predetermined emotion) for the information on emotion of the user interest object.

When the user interest object included in the content is a person or an animal, the processor 120 may recognize the emotion of the user interest object through face recognition. Here, the processor 120 may perform an operation to recognize emotion of the user interest object to obtain the emotion of the user interest object. The processor 120 may then use both the emotion of the user interest object and the user emotion to identify the user preference for the content.

Meanwhile, when the user interest object included in the content is an object (thing) from which no emotion may be recognized, the processor 120 may recognize only the user emotion. Here, the processor 120 may identify the user preference for the content using only the user emotion. For example, when the user interest object is a thing, the user may have emotion of surprise or curiosity about the thing. Here, based on the user having a predetermined emotion (surprise or curiosity) about a specific thing object, the processor 120 may identify that the user prefers the specific thing object. A detailed description is given below with reference to FIGS. 8 and 9.

In addition, the processor 120 may identify the user interest object in the content displayed on the display 110 based on at least one context of the display apparatus 100 or the user.

Here, the context of the display apparatus 100 may refer to state information and control information on the apparatus. The user context may refer to various information on the user's state, behavior, profile, etc., and may refer to at least one of the user's gaze information, biometric information or voice information.

The display apparatus 100 may identify the user interest object using the information on the context of the display apparatus 100. For example, based on the user increasing a volume of the display apparatus 100, the display apparatus 100 may identify that the user is immersed in a corresponding content, corresponding scene or corresponding object. For example, when the volume of the display apparatus 100 is increased, the display apparatus 100 may identify that the user is immersed in an object on which the user gaze is fixed at a time when the volume of the display apparatus 100 is increased. Described herein is the case where the user increases the volume, but in actual implementation, there may be used various state information on the display apparatus 100. Alternatively, the user interest object may be identified using information on a context of an external apparatus connected to the display apparatus 100. For example, it is assumed that the display apparatus 100 and an external user terminal apparatus are connected to each other by driving a specific application. In this case, when obtaining information that the user searches for a content or an object in the content currently displayed at the external user terminal apparatus, the display apparatus 100 may also identify the user interest object based on the information.

In addition, the processor 120 may identify a user degree of sympathy for at least one of the content or the user interest object based on the degree of similarity between the information on emotion of the user interest object and the information on user emotion, and may identify the user preference for the content based on the identified user degree of sympathy. The user degree of sympathy for one scene may be the same as the degree of similarity in the one scene. For example, when the user sympathizes with character A in a specific scene, the processor 120 may identify that the degree of similarity and the degree of sympathy are the same as each other. However, when the user sympathizes with character A for multiple times throughout a single content, the processor 120 may identify the degree of similarity for each of a plurality of scenes (or a plurality of sections) in which the character A appears, sum degrees of similarity in the plurality of scenes (or the plurality of sections) together and then identify the degree of sympathy based on the summed degrees of similarity. A method of obtaining the degree of sympathy by summing a plurality of degree of similarity together is described below with reference to FIGS. 10 to 12.

In addition, as described above, the processor 120 may identify the user interest object in the content displayed on the display 110 based on at least one of the user's gaze information (time the gaze stayed on the object), biometric information (heart rate or pupil size) or voice information (exclamation or preset word).

In addition, the processor 120 may provide at least one of advertisement content, recommendation content or summary content based on the user preference for the content. The processor 120 may obtain the user preferred interest object or the user preferred interest content. In addition, the processor 120 may provide advertisement, recommendation and summary contents corresponding to the user preferred object or content. The advertisement content may refer to an advertisement in the user preferred field, and the recommended content may refer to a content in the user preferred field. In addition, the summary content may refer to the content summarized by summing only the regions each including the user preferred interest object together to shorten a play time. The processor 120 may use a plurality of user preferred interest objects to provide (or generate) the summary content and may select some of the plurality of user interest objects based on a target time of the summary content. For example, in order to provide (generate) a 5 minute summary image from 1 hour content, the processor 120 may automatically calculate and use a threshold value for a degree of similarity of the user interest object to provide a summary image of around 5 minutes. When 60 is the threshold value for the degree of similarity to provide a 10 minute image, the processor 120 may raise the threshold value to increase filtering for the user interest object.

In addition, the processor 120 may identify first and second user interest objects when first and second users are identified in user images captured by the camera 105, respectively, and may identify first and second user preferences for the content based on first and second degree of similarity between information on emotions of the first and second user interest objects and information on first and second user emotions, respectively. A detailed description is given below with reference to FIG. 13.

In addition, when a plurality of user interest objects are identified in the content displayed on the display 110, the processor 120 may identify additional information on which the user gaze is focused in the content displayed on the display 110 based on the user image, and may identify one of the plurality of user interest objects based on the identified additional information, wherein the additional information may be information on each of the plurality of user interest objects.

The additional information may be used as information for specifying the object. For example, it is assumed that a user watches a game of the user's favorite baseball team; then, player B who belongs to team A plays the game wearing a uniform of team A. When the user gazes at player B, processor 120 may recognize text information A on the uniform of player B. The processor 120 may set player B as the user interest object using the text information A. When there is no text information A, the processor 120 is required to search for player B only using face recognition, which may be burdensome to processing of the processor 120. However, when the processor 120 uses the additional information, the text information A may be a clue to specify player B, and thus searching time required for the processor 120 may be shortened. Another embodiment of the additional information is described below with reference to FIG. 14.

Meanwhile, the display apparatus 100 according to the disclosure may analyze the user preference for a specific content or each scene. Then, based on a detailed user preference, the display apparatus 100 may provide or recommend a customized advertisement or content for the user. For example, it is assumed that a user watches a content of a kind of love and then the user is immersed in and sympathizes with the content. The processor 120 may identify that the user prefers the user interest object. Here, the user interest object may be an object that reflects a type of the content, such as a love scene, a particular actor, a couple with an age gap or a couple clothes. In this case, the processor 120 may recommend to the user the content related to love, the content showing the particular actor or the content showing a couple with an age gap, an advertisement content showing the couple clothes, etc.

The display apparatus 100 according to the disclosure may identify whether or not the user prefers a specific scene or a specific object rather than the content itself and thus may specifically identify information that the user is interested in. When the display apparatus 100 specifically identifies the information that the user is interested in, the user may be highly satisfied with the recommendation content provided by the display apparatus 100.

Figure 2:
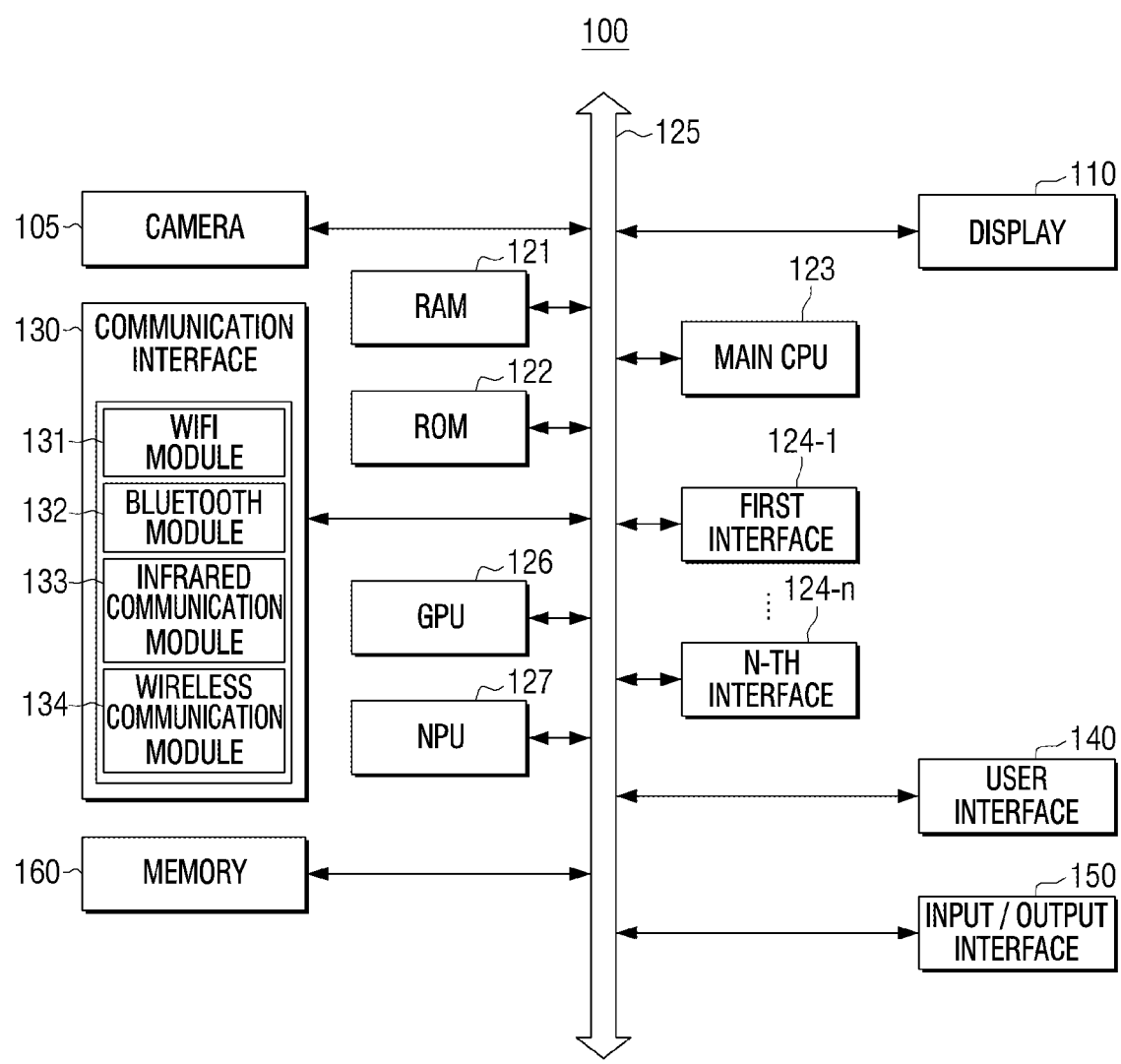
FIG. 2 is a block diagram for explaining a specific configuration of the display apparatus disclosed in FIG. 1.

FIG. 2 is a block diagram for explaining a specific configuration of the display apparatus disclosed in FIG. 1.

Referring to FIG. 2, the display apparatus 100 according to an embodiment in the disclosure may include a camera 105, a display 110, a processor 120, a communication interface 130, a user interface 140 and an input/output interface 150. The display apparatus 100 may further include a random access memory (RAM) 121, a read only memory (ROM) 122, a main central processing unit (CPU) 123, first to n-th interfaces 124-1 to 124-$n$, a bus 125, a graphics processing unit (GPU) 126 and a neural processing unit (NPU,127).

The same operations as those described above among the operations of the camera 105, the display 110, and the processor 120 are not repeatedly described.

Meanwhile, the bus 125 may be connected to the camera 105, the display 110, the processor 120, the communication interface 130, the user interface 140 and the input/output interface 150.

The processor 120 may control an overall operation of the display apparatus 100 using various programs stored in a memory 160. Meanwhile, the processor 120 according to an embodiment in the disclosure may be implemented as at least one of the main CPU 123, the GPU 126 or the NPU 127.

Meanwhile, the RAM 121, the ROM 122, the main CPU 123, the first to n-th interfaces 124-1 to 124-$n$ and the like, may be connected to one another through the bus 125.

The ROM 122 may store an instruction set for booting a system or the like therein. When a turn-on command is input to supply power to the main CPU 123, the main CPU 123 may copy an operating system (O/S) stored in the memory 160 to the RAM 121 based on an instruction stored in the ROM 122, and execute the O/S to boot the system. When the booting is completed, the main CPU 123 may copy various application programs stored in the memory 160 to the RAM 121, and execute the application programs copied to the RAM 121 to perform various operations.

The main CPU 123 may access the memory 160 to perform booting using the operating system (O/S) stored in the memory 160. In addition, the main CPU 123 may perform various operations using various programs, contents, data and the like, which are stored in the memory 160.

The first to n-th interfaces 124-1 to 124-*n* may be connected to the various components described above. One of the interfaces may be a network interface connected to an external apparatus through a network.

The GPU 126 may be a high performance processing unit for graphics processing and may be a specialized electronic circuit designed to accelerate image generation in a frame buffer to quickly process the memory, alter the memory to be output as an image on a screen. In addition, the GPU 126 may also refer to a visual processing unit (VPU).

The NPU 127 may be an artificial intelligence (AI) chipset (or AI processor) and may be an AI accelerator. The NPU 127 may be a processor chip optimized for deep neural network performance. Meanwhile, the NPU 127 may be a processing apparatus that executes a deep learning model in place of the GPU 126, and the NPU 127 may be a processing apparatus that executes a deep learning model together with the GPU 126.

Meanwhile, FIG. 2 illustrates all the main CPU 123, the GPU 126 and the NPU 127; however, in actual implementation, the processor 120 may be implemented and operated as at least one of the main CPU 123, the GPU 126 or the NPU 127.

Meanwhile, the processor 120 may perform a graphics processing function (video processing function). For example, the processor 120 may render a screen including various objects such as an icon, image, text and the like using a calculator (not illustrated) and a renderer (not illustrated). Here, the calculator (not illustrated) may calculate attribute values such as coordinate values, forms, sizes, colors and the like at which respective objects are to be displayed depending on a layout of the screen based on an received control command. In addition, the renderer (not illustrated) may render screens of various layouts including objects based on the attribute values calculated in the calculator (not illustrated).

In addition, the processor 120 may perform various kinds of image processing such as decoding, scaling, noise filtering, frame rate converting, resolution converting and the like, for the video data.

Meanwhile, the processor 120 may perform processing on audio data. Specifically, the processor 120 may perform various kinds of processing such as decoding, amplifying, noise filtering and the like, for the audio data. The communication interface 130 is a component performing communication with various types of external apparatuses in various types of communication manners. The communication interface 130 may include a wireless fidelity (WiFi) module 131, a bluetooth module 132, an infrared communication module 133, a wireless communication module 134 or the like. The processor 120 may perform communication with various external external apparatuses using the communication interface 130. Here, the external apparatus may be a display apparatus such as a TV, an image processing apparatus such as a set-top box, an external server, a control apparatus such as a remote control, an audio output apparatus such as a bluetooth speaker, a lighting apparatus, a home appliance such as a smart cleaner or a smart refrigerator, a server such as an internet of things (IOT) home manager or the like.

The WiFi module 131 and the bluetooth module 132 may perform communication in a WiFi manner and a bluetooth manner, respectively. When using the WiFi module 131 or the bluetooth module 132, various kinds of connection information such as a service set identifier (SSID), a session key and the like, are first transmitted and received, communication is connected using the connection information, and various kinds of information may then be transmitted and received.

The infrared communication module 133 may perform communication based on an infrared data association (IrDA) technology for transmitting data wirelessly at a short distance using an infrared ray between a time ray and a millimeter wave.

In addition to the WiFi module 131 and the Bluetooth module 132 as described above, the wireless communication module 134 may refer to a module that performs communication based on various communication standards such as a zigbee, a 3rd generation (3G) evolution, a 3rd generation partnership project (3GPP), a long term evolution (LTE), LTE Advanced (LTE-A), a 4th Generation (4G) evolution, a 5th generation (5G) evolution, etc.

In addition, the communication interface 130 may include at least one of a local area network (LAN) module, an Ethernet module or a wired communication module that performs communication using a pair cable, a coaxial cable, an optical fiber cable or the like.

According to an embodiment, the communication interface 130 may use the same communication module (e.g., a WiFi module) to communicate with an external apparatus such as a remote control and an external server.

According to another embodiment, the communication interface 130 may use a different communication module (e.g., a WiFi module) to communicate with an external apparatus such as a remote control and an external server. For example, the communication interface 130 may use at least one of an Ethernet module or a WiFi module to communicate with an external server, and may use a bluetooth (BT) module to communicate with an external apparatus such as a remote control. However, this is only an example, and the communication interface 130 may use at least one communication module among various communication modules when communicating with a plurality of external apparatuses or external servers.

Meanwhile, the communication interface 130 may further include a tuner and a demodulator according to another embodiment.

The tuner (not illustrated) may receive a radio frequency (RF) broadcast signal by tuning a channel selected by a user or all pre-stored channels among RF broadcast signals received through an antenna.

The demodulator (not illustrated) may receive and demodulate a digital intermediate frequency (DIF) signal converted by the tuner and may perform channel decoding or the like.

The user interface 140 may be implemented as an apparatus such as a button, a touch pad, a mouse or a keyboard, or a touch screen capable of performing the above-described display function and operation input function. Here, the button may be one of various types of buttons such as a mechanical button, a touch pad, a wheel and the like, which are formed in any region such as a front surface portion, a side surface portion, a rear surface portion and the like of a body appearance of the display apparatus 100.

The input/output interface 150 may be an interface of any of a high definition multimedia interface (HDMI), a mobile high-definition link (MHL), a universal serial bus (USB), a display port (DP), a thunderbolt, a video graphics array (VGA) port, a red-green-blue (RGB) port, a d-subminiature (D-SUB) or a digital visual interface (DVI).

The HDMI is an interface capable of transmitting high-performance data for an audio visual (AV) equipment that inputs and outputs audio and video signals. The DP is an interface which may provide not only a screen of a 1920×1080 full HD class but also a screen of an ultra-high resolution such as 2560×1600 or 3840×2160, provide a 3D stereoscopic image and also deliver a digital voice. The thunderbolt is an input/output interface for high-speed data transfer and connection, and may connect all of a personal computer (PC), display, and storage to one port in parallel.

The input/output interface 150 may input or output at least one of audio signals or video signals.

According to an embodiment, the input/output interface 150 may include a port for inputting/outputting only audio signals and a port for inputting/outputting only video signals as separate ports, or a single port for inputting/outputting both audio signals and video signals.

The display apparatus 100 may be implemented as an apparatus that does not include a display, and may transmit an image signal to a separate display apparatus.

The display apparatus 100 may transmit a voice signal to an external server for voice recognition of the voice signal received from the external apparatus.

In this case, the communication module may be implemented as a single module for communication with the external apparatus and the external server. For example, the communication module for communication with the external apparatus and the external server may be the same WiFi module.

Communication modules for communications with an external apparatus and an external server may be implemented as separate modules. For example, the bluetooth module may be used to perform communication with the external apparatus, and the ethernet modem or the WiFi module may be used to perform communication with the external server.

The memory 160 may be implemented as an internal memory such as a ROM (e.g., an electrically erasable programmable read-only memory (EEPROM)), a RAM or the like, included in the processor 120, or be implemented as a memory separate from the processor 120.

Meanwhile, when a memory is embedded in the electronic apparatus 100, the memory may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard disk drive (HDD) or a solid state drive (SSD). When a memory is removably attached to the electronic apparatus 100, the memory may be implemented as a memory card (e.g., a compact flash (CF)), a secure digital (SD), a micro secure digital (Micro-SD), a mini secure digital (Mini-SD), an extreme digital (xD), a multi-media card (MMC)), an external memory connectable to a universal serial bus (USB) port (e.g., USB memory) or the like.

The speaker (not illustrated) may be a component outputting various notification sounds, an audio message or the like as well as various audio data processed by the input/output interface 150.

Meanwhile, the electronic apparatus 100 may additionally include a microphone (not illustrated). The microphone is a component for receiving a user voice or other sound and converting it into audio data. In this case, the microphone may convert a received analog signal of the user voice into a digital voice signal and transmit it to the electronic apparatus 100.

The microphone (not illustrated) may receive the user voice in an activated state. For example, the microphone may be integrally formed on an upper direction, a front direction, side directions or the like of the electronic apparatus 100. The microphone may include various components such as a microphone collecting the user voice in an analog form, an amplifier circuit amplifying the collected user voice, an analog to digital (A/D) conversion circuit sampling the amplified user voice to convert the voice into a digital signal, a filter circuit removing a noise component from the converted digital signal.

The display apparatus 100 according to an embodiment in the disclosure may transmit a digital voice signal received by a voice recognition server. In this case, the voice recognition server may convert the digital voice signal into text information using a speech-to-text (STT) function. In this case, the voice recognition server may transmit the text information to another server or the electronic apparatus to perform a search based on the text information, and in some cases, may perform a direct search.

Meanwhile, the display apparatus 100 according to another embodiment in the disclosure may directly apply the speech-to-text (STT) function to a digital voice signal, convert the signal into the text information and transmit the converted text information to an external server.

Figure 3:
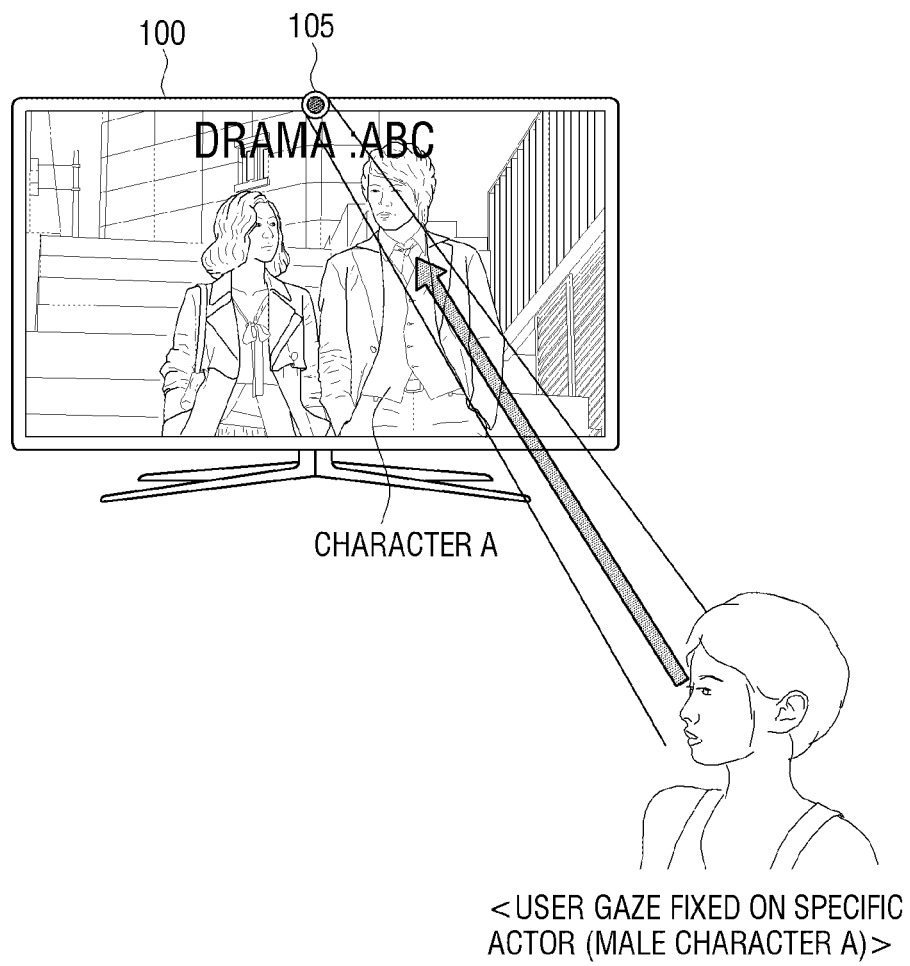
FIG. 3 is a diagram for explaining an operation to analyze a user gaze.

FIG. 3 is a diagram for explaining an operation to analyze a user gaze

Referring to FIG. 3, the display apparatus 100 may recognize a user face using the camera 105. The display apparatus 100 may then recognize and track the user gaze using the camera 105. The display apparatus 100 may track the user gaze to identify where the user gazes at. Specifically, the display apparatus 100 may identify whether the user gazes at the content provided by the display apparatus 100 or a portion other than the display 110 of the display apparatus 100. In addition, the display apparatus 100 may identify which part of the content provided by the display 110 the user gazes at.

For example, it is assumed that the display apparatus 100 displays the drama ABC on the display 110; and character A appears in the drama ABC. The display apparatus 100 may track the user gaze using the camera 105 to identify that the user gazes at character A. Here, the display apparatus 100 may analyze (identify) the user interest object as character A, and store this information in the memory 160.

Figure 4:
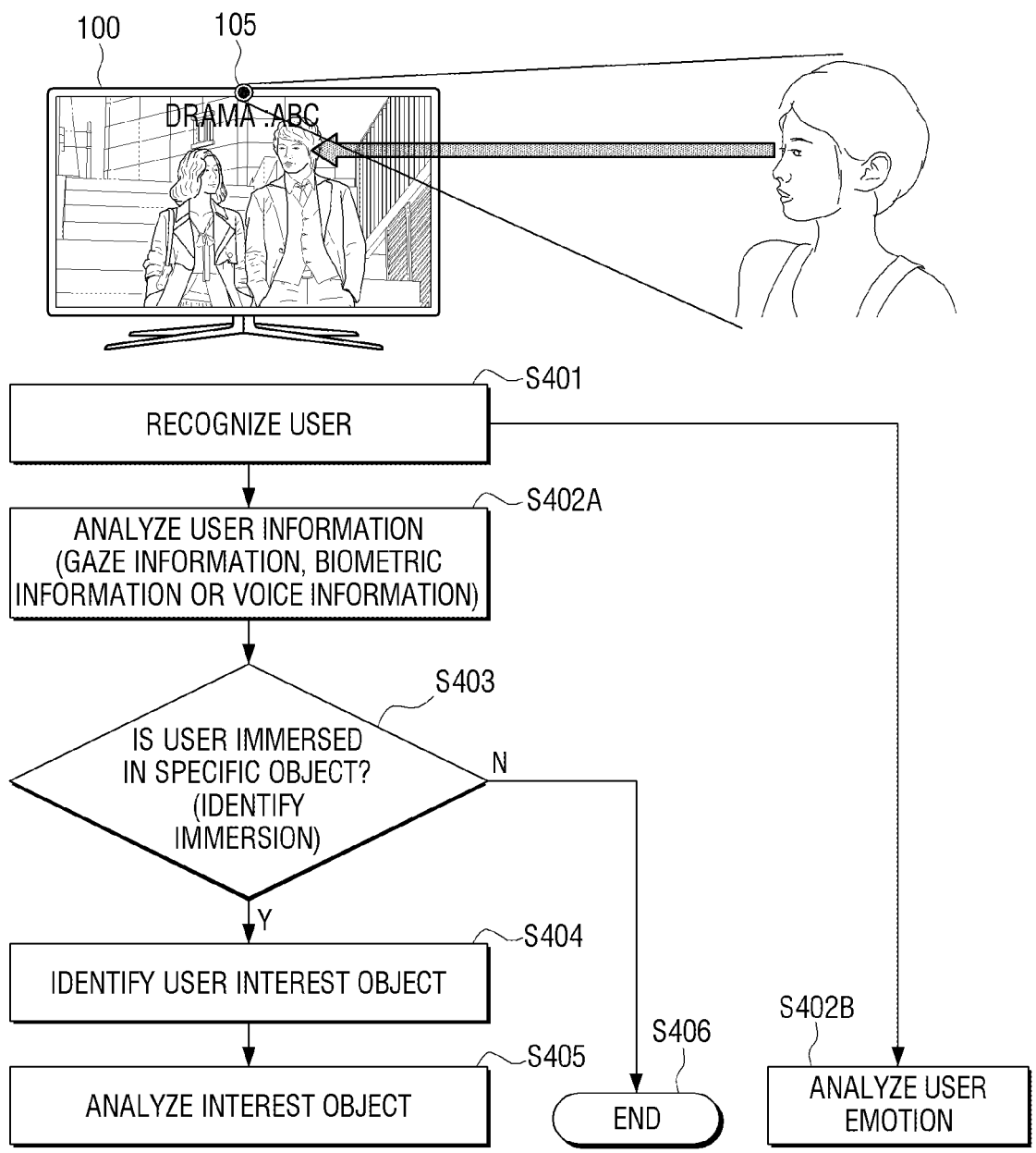
FIG. 4 is a diagram for explaining an operation to analyze a user image, and thereby to analyze a user interest object and user emotion.

FIG. 4 is a diagram for explaining an operation to analyze a user image, and thereby to analyze the user interest object and user emotion.

Referring to FIG. 4, the display apparatus 100 may recognize the user (Step S401). For example, the display apparatus may recognize the face of the user based on an image captured using the camera 105. The display apparatus 100 may specify the user based on an image of the user face. For example, a plurality of user information may be registered in the display apparatus 100, and the display apparatus 100 may specify the user among the plurality of user information by recognizing the user face.

In addition, the display apparatus 100 may analyze the user information (Step S402A). Specifically, the user information (user context information) may include at least one of the user's gaze information, biometric information or voice information. Here, the display apparatus 100 may identify the user interest object using the user information, and obtain information on the user interest object. Specifically, the display apparatus 100 may identify whether or not the user is immersed in a specific object using the user information (user context information) (Step S403). When it is identified that the user is immersed in the specific object, the display apparatus 100 may identify the specific object as the user interest object (Step S404). The display apparatus 100 may set the identified object as the user interest object. When it is identified that the user is not immersed in the specific object, the display apparatus 100 may end an operation to identify the user interest object (Step S405). In addition, the display apparatus 100 may obtain various information on the user interest object such as name, type and detailed information on the user interest object.

Meanwhile, the display apparatus 100 may, after obtaining the image of the user face using the camera 105, analyze the user emotion based on the image of the user face (S402B). For example, the display apparatus 100 may identify the user emotion. The user emotion may include various emotions, such as joy, sadness, surprise, curiosity, anger and fear.

A specific embodiment of analysis of the display apparatus 100 on the user interest object and user emotion is described below in FIG. 5

Figure 5:
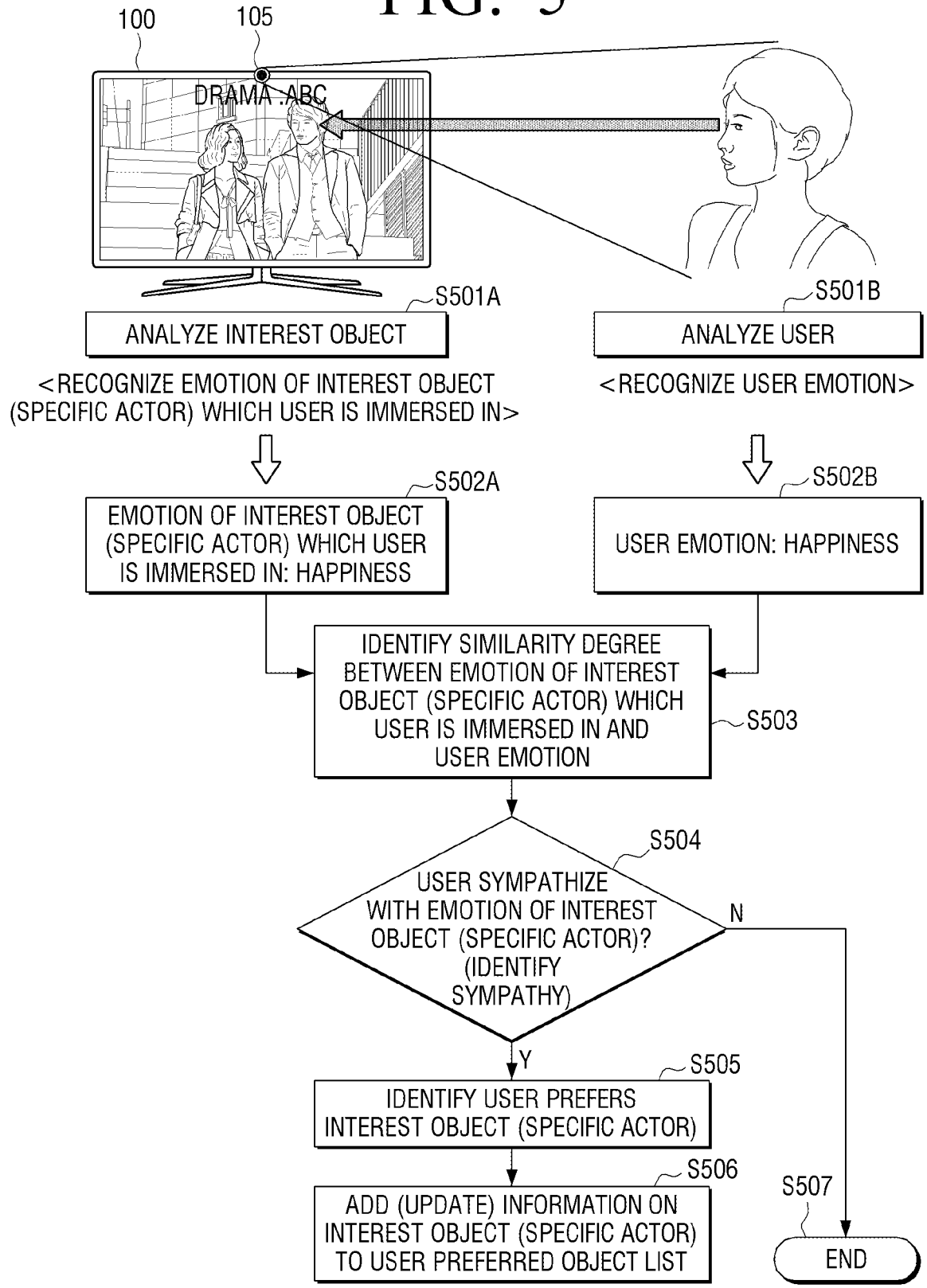
FIG. 5 is a diagram for explaining an operation to identify a user interest object and user emotion.

FIG. 5 is a diagram for explaining an operation to identify a user interest object and user emotion.

Referring to FIG. 5, the display apparatus 100 may recognize emotion of a specific actor that the user is immersed in by an operation to analyze the user interest object (Step S501A). It may be assumed that the user gazes at character A, the main character of drama ABC. When it is identified that the user gaze is fixed on character A, the display apparatus 100 may designate character A as the user interest object. In addition, the display apparatus 100 may recognize the emotion of character A (user interest object) (Step S502A).

Here, an operation to recognize the emotion of the user interest object may be performed by analyzing a content image. The display apparatus 100 may identify character A in the content image and analyze the emotion of the identified character A. The display apparatus 100 may comprehensively consider at least one of an eye or eyes, a nose, a mouth, an eyebrow or eyebrows, ball muscles, ear movements, or an outline of the entire face or the like of the user interest object in order to analyze the emotion of the user interest object. For example, the display apparatus 100 may analyze the content image and identify the emotion of character A as "happiness". The display apparatus 100 may store character A in matching with "happiness".

Meanwhile (e.g., simultaneously, although could be before or after S501A, S502A), the display apparatus 100 may analyze the user emotion using the camera 105 (Step S501B). For example, the display apparatus 100 may identify that the user emotion is "happiness." The display apparatus 100 may store the user emotion in matching with "happiness" (Step S502B).

Here, the display apparatus 100 may compare and analyze the emotion of the user interest object (specific actor) and the user emotion to each other. Specifically, the display apparatus 100 may identify the degree of similarity between the emotion of the user interest object (specific actor) and the user emotion (Step S503). Here, the degree of similarity may refer to an extent to which the both emotions are matched to each other. A process of calculating the degree of similarity is described below with reference to FIG. 6.

The display apparatus 100 may identify whether the emotion of the user interest object (specific actor) and the user emotion are similar to each other by an operation to identify the degree of similarity of the two emotions; and a determination of whether or not the two emotions are similar to each other may be a determination of whether or not the user emotionally sympathizes with the user interest object (specific actor) (Step S504). When it is identified that the user emotionally sympathizes with the user interest object (e.g., a specific actor), the display apparatus 100 may determine that the user prefers the user interest object (e.g., the specific actor) (Step S505), and may add the information on the user interest object (e.g., the specific actor) to or update in a user preferred object list (Step S506), which may, for example, be stored in a database of a memory. When it is identified that the user does not emotionally sympathize with the user interest object (e.g., the specific actor), the display apparatus 100 may end the corresponding operation (Step S507).

FIG. 6 is a diagram for explaining a degree of similarity between emotion of a user interest object and user emotion.

The display apparatus 100 may obtain the degree of similarity by comparing emotion of the user interest object with the user emotion. Here, the degree of similarity may be a numerical value showing how much the emotion of the user interest object and the user emotion are similar to each other. For example, it may be assumed that 0 point is a dissimilar emotion case and 100 points is the same emotion case. Here, a range from 0 to 100 may depend on a user set.

For example, when the emotion of the user interest object is happiness and the user emotion is happiness, the degree of similarity may be determined to be high. When the emotion of the user interest object and the user emotion are the same (e.g., both happiness), 100 may be the degree of similarity. When the emotion of the user interest object is happiness and the user emotion is joy, the display apparatus 100 may identify that the user emotion is a very similar emotion even though not the same emotion. Thus, the very similar emotion may have a degree of similarity that is less than 100 but close to 100 (e.g., 80 or 90). Whereas, when the emotion of the user interest object is happiness and the user emotion is sadness, the display apparatus 100 may identify that the user emotion is a dissimilar emotion and may determine that the degree of similarity is low (e.g., 10 or 20).

Meanwhile, the degree of similarity may be determined to be high based on a predefined relationship (e.g., a relationship between the same emotions or even a relationship between dissimilar emotions). For example, when the emotion of the user interest object is fear and the user emotion is a surprise, the user emotion may be a matching emotion even though not a similar emotion. The display apparatus 100 may determine that there is a high degree of similarity between the fear-surprise emotions. An identification of the degree of similarity in the disclosure is to identify whether or not the user sympathizes with the user interest object included in the content. Thus, even though the user emotion is neither identical nor similar to emotion of the user interest object, the display apparatus 100 may identify that the degree of similarity is high when the user emotion is a matching emotion.

Here, the degree of similarity between the emotion of the user interest object and the user emotion may depend on the user set and may correspond to pre-stored information.

Meanwhile, according to another embodiment, the display apparatus 100 may calculate the degree of similarity in real time based on the obtained emotion of the user interest object, user emotion, and user information (gaze information, biometric information or voice information). The display apparatus 100 may be implemented in a format that updates information on the degree of similarity calculated in real time to existing information on the degree of similarity.

Meanwhile, based on a value of the degree of similarity being equal to or greater than the threshold value, the display apparatus 100 may identify that the user emotionally sympathizes with the object.

Figure 7:
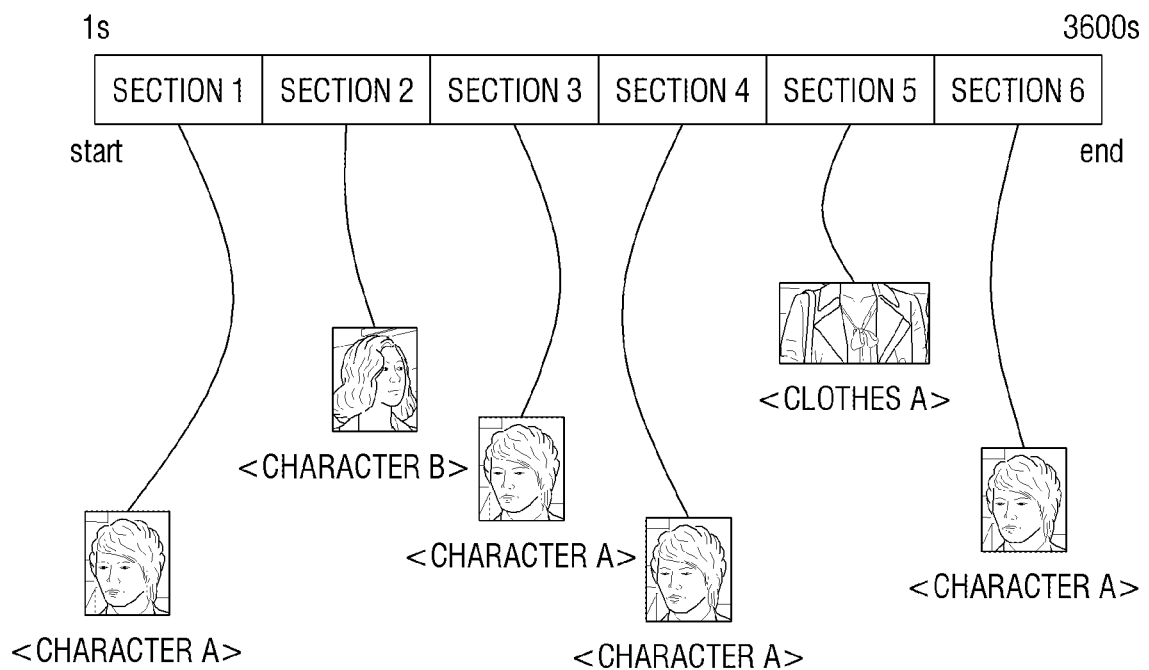
FIG. 7 is a diagram for explaining an operation to divide a content into a plurality of sections and to identify a user interest object.

FIG. 7 is a diagram for explaining an operation to divide a content into a plurality of sections and to identify a user interest object.

Meanwhile, the display apparatus 100 may divide the content into a plurality of sections based on a play time of the content displayed on the display 110. The display apparatus 100 may obtain each representative user interest object that the user is interested in for each of the plurality of sections. For example, it is assumed that a single content has a play time of 3600 seconds, and the 3600 seconds may be divided into certain time sections. The display apparatus 100 may divide the content into six sections each having 600 seconds. In addition, the display apparatus 100 may set each object in which the user is most immersed for each section as a representative user interest object for each section. Referring to FIG. 7, the user may most sympathize with (or may be most immersed in) character A in sections 1, 3, 4 and 6. In addition, the user may most sympathize with (or be most immersed in) character B in section 2, and a clothes A of character B in section 5.

Thereafter, the display apparatus 100 may sum the representative user interest objects in the respective sections and then summarize these objects into a single user interest object in which the user is most immersed throughout all the content (from 0 to 3600 seconds). In this case, character A may be the user interest object representing the content. The display apparatus 100 may identify that character A is the object in which the user is most interested.

Figure 8:
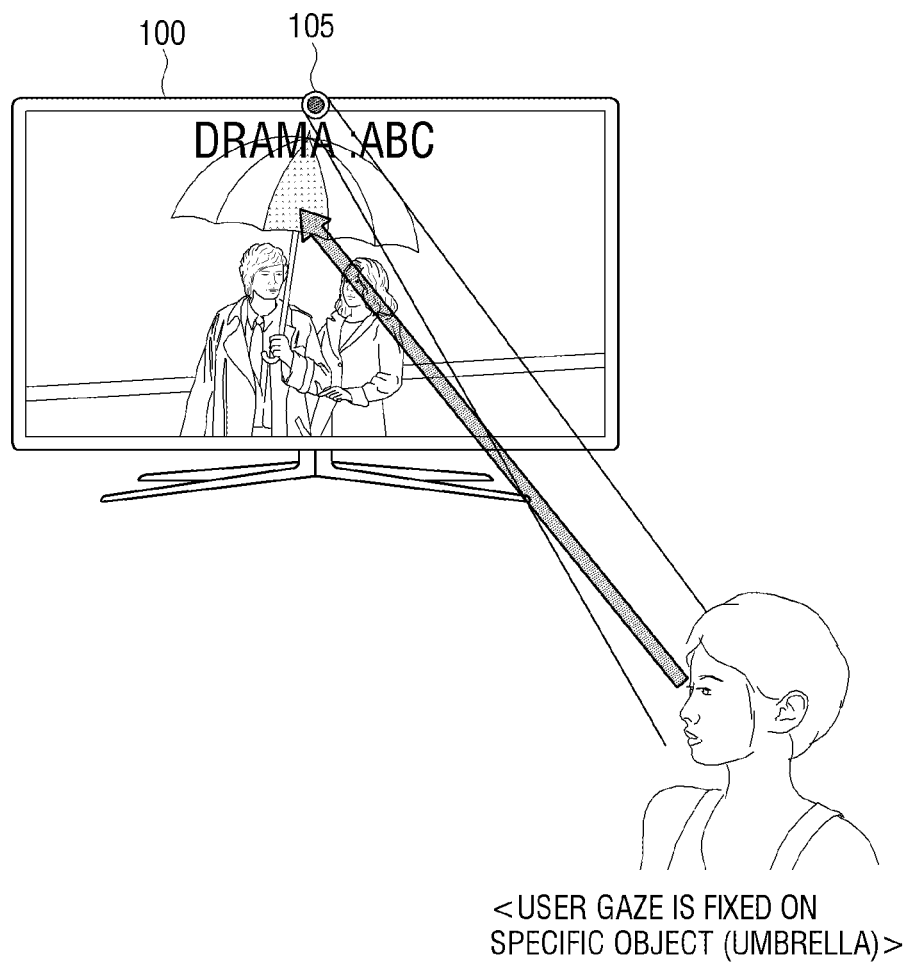
FIG. 8 is a diagram for explaining a case that a user gaze is fixed on a specific object.

FIG. 8 is a diagram for explaining a case that a user gaze is fixed on a specific object.

The user may sympathize with or may be immersed in an object which is not a character. For example, the user may be interested in a thing or place in a drama. The user may be interested in a thing held by the character in the drama. In this case, the display apparatus 100 may identify that the user gaze is fixed on the thing, not a character.

Referring to FIG. 8, a scene in which character A holds an umbrella is displayed on the display apparatus 100, and the user gaze is fixed on the umbrella held by character A. The display apparatus 100 may track the user gaze and identify that the user gazes at the umbrella held by character A, and may set and store the umbrella as the user interest object.

Figure 9:
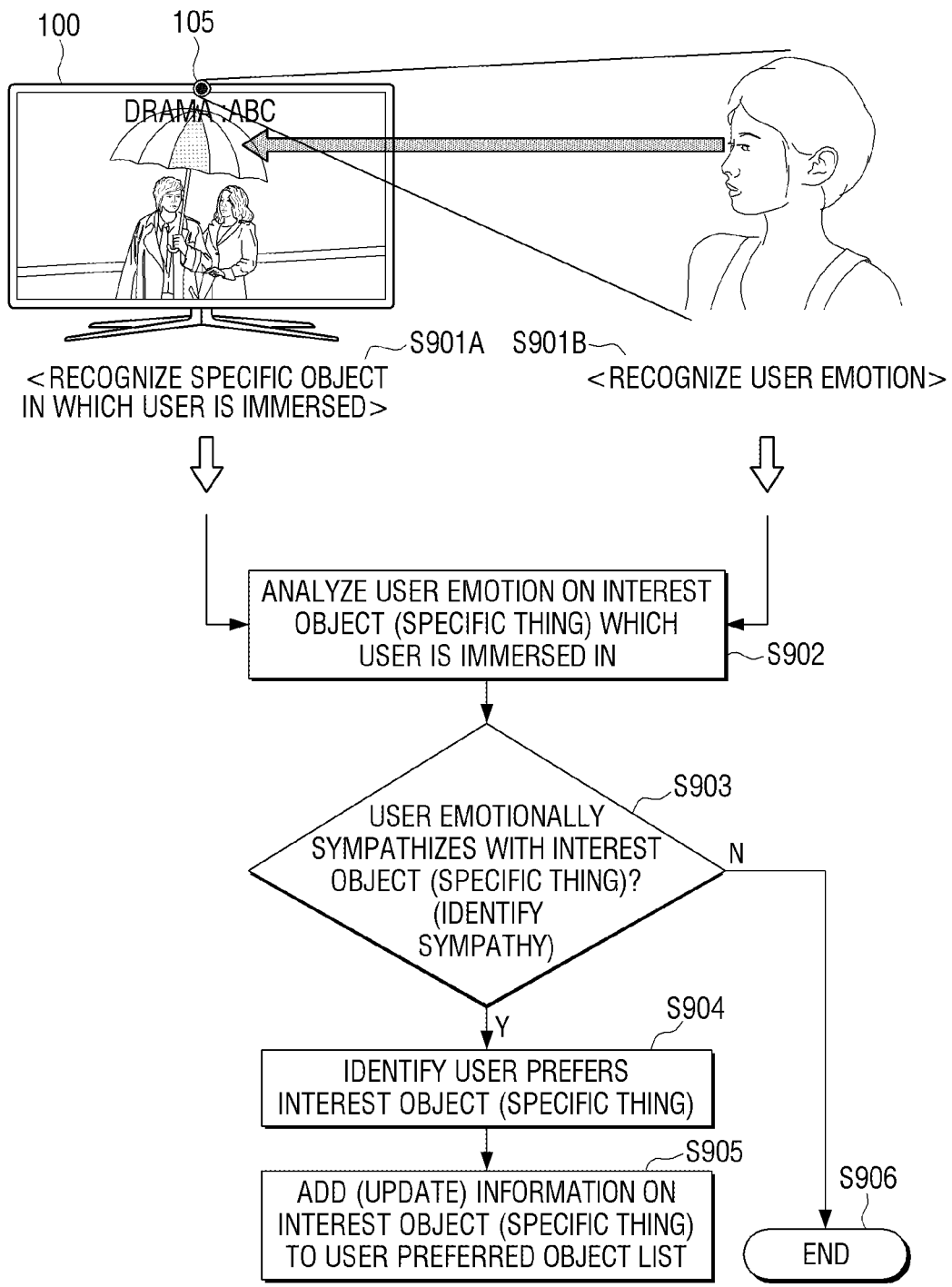
FIG. 9 is a diagram for explaining an operation of a display apparatus based on a user gaze being fixed on a specific object.

FIG. 9 is a diagram for explaining an operation of a display apparatus based on a user gaze being fixed on a specific object.

Referring to FIG. 9, based on the user gaze being fixed on a specific object (e.g., the umbrella held by character A), the display apparatus 100 may identify (or set) the umbrella held by character A as the user interest object. Here, the display apparatus 100 may capture the user face when the user gazes at the umbrella using the camera 105. The display apparatus 100 may capture the user face and recognize the user emotion (e.g., as curiosity) (Step S901B).

Here, the display apparatus 100 may analyze the user emotion on the user interest object (specific thing, e.g., umbrella) which the user is immersed in (or sympathizes with) (Step S902). Specifically, the display apparatus 100 may identify whether or not the user prefers the user interest object (specific thing, e.g., umbrella). Specifically, based on the user emotion corresponding to the predetermined emotion, the display apparatus 100 may identify that the user emotionally sympathizes with the user interest object (specific thing, e.g., umbrella); and based on the user emotion not corresponding to the predetermined emotion, the display apparatus 100 may perform no operation (Step S906). For example, based on the predetermined emotion corresponding to a curiosity and the user emotion recognized through the user face corresponding to the curiosity, the display apparatus 100 may identify that the user emotionally sympathizes with the user interest object (specific thing, e.g., umbrella). Then, the display apparatus 100 may identify that the user prefers the user interest object (specific thing, e.g., umbrella) (Step S905), and may optionally add the information on the user interest object (specific thing, e.g., umbrella) to or update in the user preferred object list (S905).

FIG. 10 is a diagram for explaining an operation of a display apparatus to analyze a user preference using information on all objects obtained by the display apparatus.

Referring to FIG. 10, the display apparatus 100 may store in a table, various information on a plurality of objects included in a single content. Based on the user watching a specific content, the display apparatus 100 may store information on the object that the user watches. The information on the object may include at least one of an object appearance frequency and the user's sympathy frequency, degree of sympathy, immersion frequency or degree of immersion. The object appearance frequency may indicate a total frequency in which the object appears in the content. The user's sympathy frequency may indicate a frequency based on the value of the degree of similarity described in FIG. 6 being equal to or greater than the threshold value. The degree of sympathy may be calculated using the sympathy frequency/appearance frequency. According to another embodiment, the degree of sympathy may be obtained by various calculation methods using at least one of the appearance frequency or the sympathy frequency. Here, when the user interest object is the character, the display apparatus 100 may identify the degree of similarity based on both the emotion of the user interest object and the user emotion, and calculate the sympathy frequency using the degree of similarity. Meanwhile, when the user interest object is a thing having no emotion (e.g. place, cosmetic, shoes or clothes), the display apparatus 100 may identify the degree of similarity only using the user emotion.

In addition, the immersion frequency may be identified based on time information on how long the user gaze is fixed on the object. For example, based on the user gaze being fixed on a specific object (e.g., at a time equal to or longer than a threshold value), the display apparatus 100 may identify that the user is immersed in the object. Here, the immersion may be identified by the immersion frequency using at least one of the user's gaze information, biometric information or voice information. The degree of immersion may be calculated using the immersion frequency/appearance frequency. According to another embodiment, the degree of immersion may be obtained by various calculation methods using at least one of the appearance frequency or the immersion frequency.

Meanwhile, the display apparatus 100 may identify the user preference for the content using information on all the objects included in the content. Alternatively, the display apparatus 100 may identify the user preference for the content only using information on some objects, not all the objects.

The user preference for the content may be identified based on both the degree of sympathy and degree of immersion. Specifically, it may be identified that the user preference for the content is obtained based on an average value of the degree of sympathy and the degree of immersion on the object is equal to or greater than the threshold value. However, the user preference identification is not limited thereto, and the display apparatus 100 may identify the user preference using various methods. For example, the user preference may be identified (or obtained) using a method in which a weight may be set based on the degree of immersion and then the weight is applied to the degree of sympathy.

In the above-described embodiments, data on all the object is stored regardless of an operation to set the user interest object. However, for an efficient data processing, the display apparatus 100 may calculate information only on the user interest object rather than all the objects. Here, the user interest object may refer to an object that the user is immersed in once or more, and the display apparatus 100 may not check the user's degree of sympathy for an object in which the user is not immersed once.

According to the embodiments in FIGS. 4 and 5, the user interest object may be set first among the objects disclosed in FIG. 10. Here, the user interest object may be set (or identified) based on the degree of immersion, and the degree of sympathy may be identified only based on identifying that the user is immersed in a specific object. As described in FIG. 10, for example, the user may never be immersed in characters D and E, and the display apparatus 100 may not identify the degree of sympathy for the objects. In order to identify the degree of sympathy, the display apparatus 100 is required to perform face recognition and emotion recognition operations; and thus, when performing the emotion recognition operation only on the user interest object, the display apparatus 100 may have reduced data throughput.

FIG. 11 is a diagram for explaining an operation of a display apparatus to analyze a user preference based on an object appearance frequency.

The display apparatus 100 may identify that an object for preference determination is only the object having an appearance frequency equal to or greater than the threshold value and filter the data of the object. For example, the display apparatus 100 may identify the user preference for the content using only the objects of which appearance frequency is 5 times or more. Here, the display apparatus 100 may identify the user preference for the content only using characters A, B, and C and places A and B. When the display apparatus 100 filters only some objects, not all the objects, to identify the user preference, the reliability and accuracy of the user preference determination may be enhanced.

FIG. 12 is a diagram for explaining an operation of a display apparatus to analyze a user preference by using a different threshold value depending on an object type.

Referring to FIG. 12, the display apparatus 100 may identify the user preference using a different threshold value depending on an object type. For example, it is assumed that the object type may be a character, a place, a cosmetic, shoes and clothes. Based on the data that the character has the highest proportion in the content, and the display apparatus 100 may thus set the character to have a high threshold value of the appearance frequency. The display apparatus 100 may set 30, 7 and 4 as the respective threshold values of the appearance frequencies of the character, place and object. In this case, the display apparatus 100 may obtain by filtering, information on characters A and B, place A, shoes A, clothes B and C among a plurality of objects included in the content. Then, the display apparatus 100 may identify the user preference for the content only using the information on the characters A and B, place A, shoes A, clothes B and C. When the display apparatus 100 filters only some objects, not all the objects, and sets a different threshold value of the appearance frequency for each object type to identify the user preference, the reliability and accuracy of the user preference determination may be enhanced.

Meanwhile, the threshold value in FIGS. 11 and 12 is used to the appearance frequency, and is not limited thereto. According to another embodiment, the display apparatus 100 may filter only an object having the sympathy frequency or the immersion frequency equal to or great than the threshold value thereof.

Figure 13:
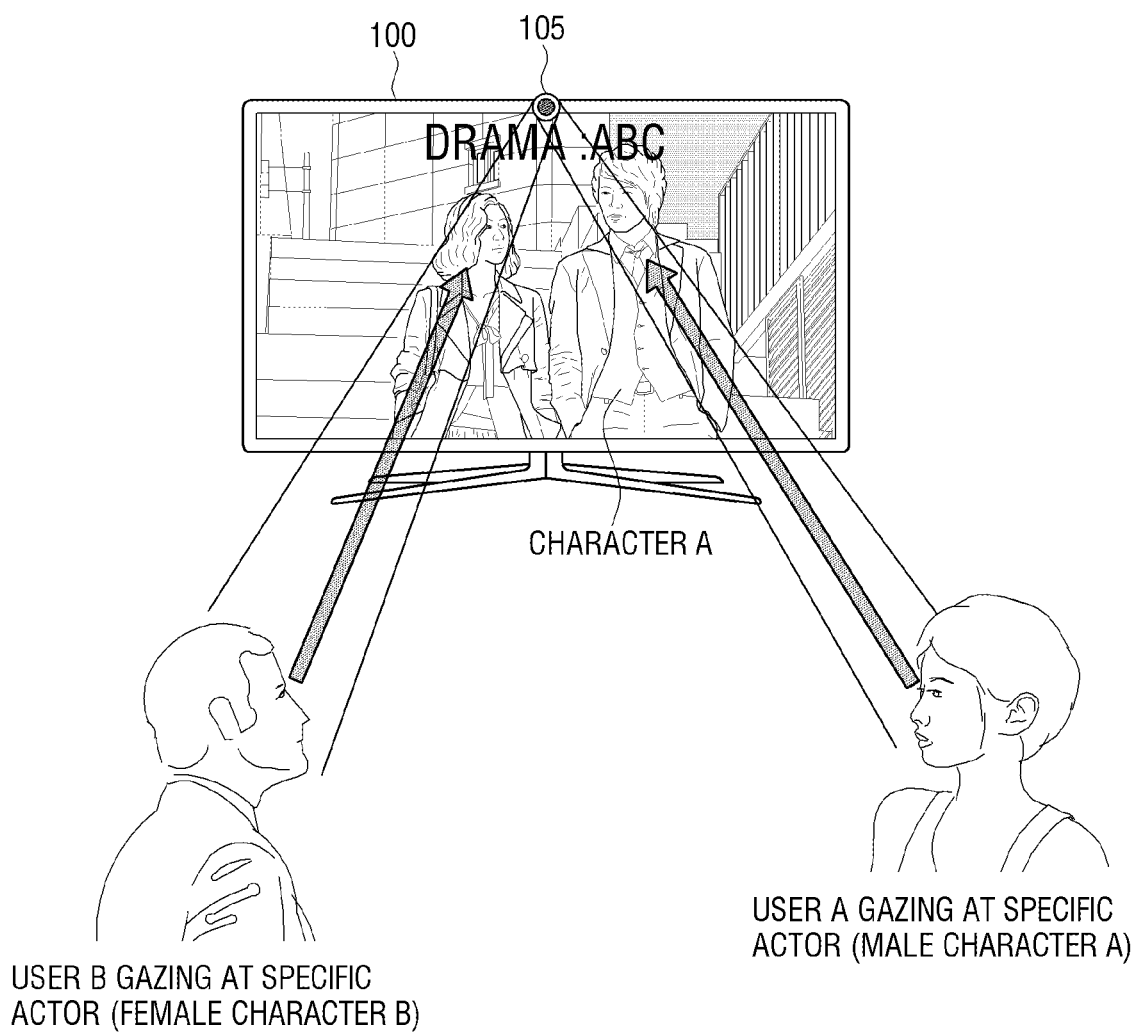
FIG. 13 is a diagram for explaining an operation of a display apparatus according to another embodiment in the disclosure.

FIG. 13 is a diagram for explaining an operation of a display apparatus according to another embodiment in the disclosure.

The display apparatus 100 may distinguish a plurality of users. It is assumed that user A and user B are around the display apparatus 100. The display apparatus 100 may distinguish the plurality of users A and B using the camera 105. It is assumed that the user A gazes at character A and the user B gazes at character B. For example, the female user A may gaze at the male actor character A, and the male user B may gaze at the female actress character B. Here, the display apparatus 100 may identify which interest objects the user A and the user B gaze at, respectively.

The display apparatus 100 may identify that each user may have an individual interest object. The display apparatus 100 may distinguish the emotions of the users A and B from each other and compare the emotions of the users A and B with the emotion of the user interest objects to each other, respectively. Here, the degree of similarity between the user A and the character A may be calculated to be different from the degree of similarity between the user B and the character A, and the user preferences therebetween may also be different from each other. For example, the user A may have a high preference for character A; whereas, the user B may have a low preference for character A.

The display apparatus 100 may analyze each preference of a plurality of users, and may provide a customized content for each user.

Figure 14:
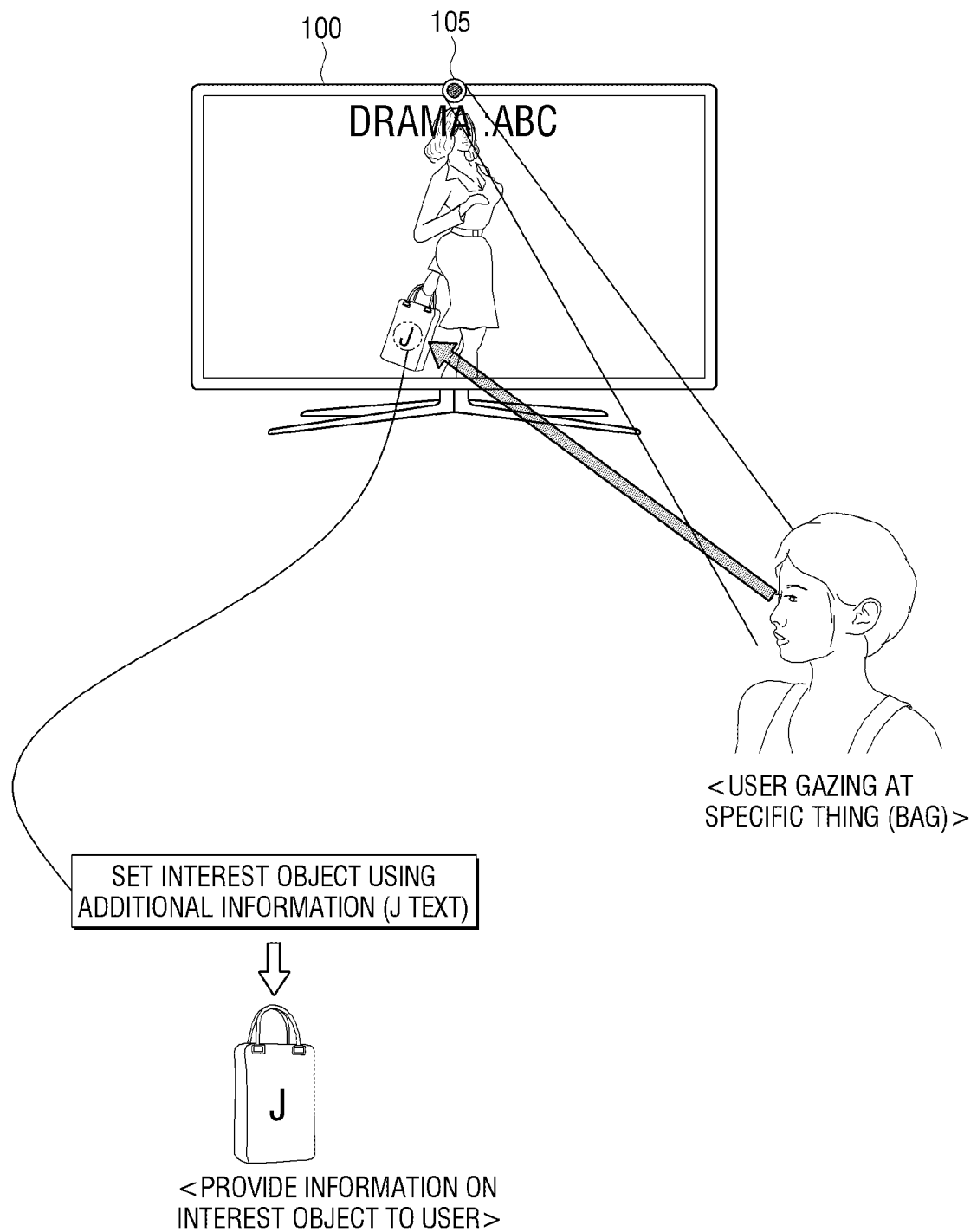
FIG. 14 is a diagram for explaining an operation of a display apparatus to identify a user interest object using additional information.

FIG. 14 is a diagram for explaining an operation of a display apparatus to identify a user interest object using additional information.

Referring to FIG. 14, the display apparatus 100 may identify the user interest object using additional information included in the content image. Here, the additional information may refer to detailed information on the object included in the content. The detail information may be various images including information on the object. For example, based on a thing object being identified in the content, the additional information may be at least one of a trademark name, a logo, a design, a pattern, a motif or a color displayed on the thing. Then, the display apparatus 100 may search for the user interest object identified using the additional information through the external server, and may receive a search result of the external server and provide the user with the search result.

As shown in FIG. 14, it is assumed that character B holds a bag marked "J". The display apparatus 100 may recognize the user A using the camera 105 and may identify that the user A gazes at character B's bag. Specifically, the display apparatus 100 may identify that the user A gazes at the "J" portion displayed on character B's bag. Here, the display apparatus 100 may identify that the "J" is a brand, and may set the "J" brand bag as the user interest object using the "J" as the additional information. In addition, the display apparatus 100 may search for the same (or similar) goods through the external server based on the color and appearance of the "J" brand and the bag displayed on the image. Then, the display apparatus 100 may receive the searched result and provide the result to the user. The additional information may refer to the detailed information on the object, and the display apparatus 100 may use the additional information to obtain an accurate model or item name of the object that the user is interested in. Accordingly, the display apparatus 100 may identify the user preference in detail, thereby increasing the reliability and accuracy of the user preference determination.

Figure 15:
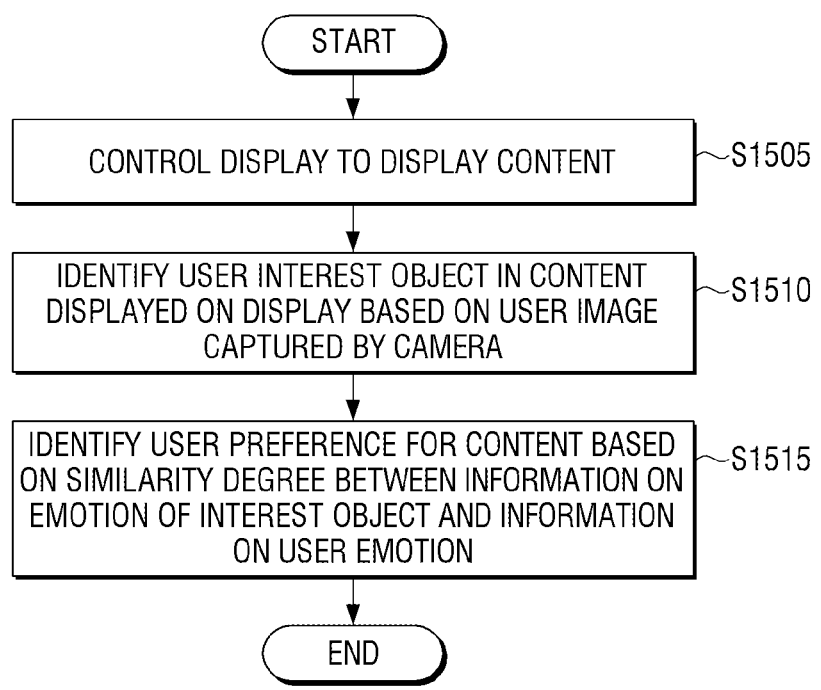
FIG. 15 is a diagram for explaining a controlling method of a display apparatus according to an embodiment in the disclosure.

FIG. 15 is a diagram for explaining a controlling method of a display apparatus according to an embodiment in the disclosure.

Meanwhile, a controlling method of a display apparatus 100 may include controlling a display 110 to display a content (S1505).

In addition, the display apparatus 100 may identify a user interest object in the content (S1510) displayed on the display 110 based on a user image captured by a camera 105.

In addition, the display apparatus 100 may identify a user preference for the content (S1515) based on a degree of similarity between information on emotion of the user interest object and information on user emotion.

The identifying of the user preference for the content (S1515) may include: identifying the user preference for the user interest object based on the degree of similarity between the information on emotion of the user interest object and the information on user emotion; and identifying the user preference for at least one of the content or a content type corresponding to the content based on the user preference for each of a plurality of the user interest objects.

Here, the identifying of the user preference for the content (S1515) may include: identifying the content as a plurality of content sections, and the user interest object for each of the plurality of content sections; and identifying the user preference for the content based on the degree of similarity between the information on emotion of the identified user interest object for each content section and the information on user emotion corresponding to the each content section.

In addition, the identifying of the user preference for the content (S1515) may include: identifying the user preference for the content based on a first degree of similarity based on it being identified that the information on emotion of the user interest object and the information on user emotion are identical or similar to each other; and identifying the user preference for the content based on a second degree of similarity based on it being identified that the information on user emotion is a reaction emotion for the information on emotion of the user interest object.

In addition, the identifying of the user interest object in the content (S1510) may include identifying the user interest object in the content displayed on the display 110 based on at least one context of the display apparatus 100 or the user.

In addition, the identifying of the user preference for the content (S1515) may include: identifying a user degree of sympathy for at least one of the content or the user interest object based on the degree of similarity between the information on emotion of the user interest object and the information on user emotion; and identifying the user preference for the content based on the identified user degree of sympathy.

In addition, the identifying of the user interest object in the content (S1510) may include identifying the user interest object in the content displayed on the display 110 based on at least one of the user's gaze information, biometric information or voice information.

Meanwhile, the controlling method of the display apparatus 100 may further include providing at least one of advertisement content, recommendation content or summary content based on the user preference for the content.

In addition, the identifying of the user preference for the content (S1515) may include: identifying first and second user interest objects, respectively, based on first and second users being identified in user images captured by the camera 105; and identifying first and second user preferences for the content based on first and second degree of similarity between information on emotions of the first and second user interest objects and information on first and second user emotions, respectively.

Meanwhile, the controlling method of the display apparatus 100 as disclosed in FIG. 15 may be executed on the display apparatus 100 having the configuration of FIG. 1 or 2, or on the display apparatus 100 having another configuration.

Meanwhile, the methods according to various embodiments in the disclosure described above may be implemented in a form of an application that can be installed in an existing display apparatus.

In addition, the methods according to the various embodiments in the disclosure described above may be implemented by only software upgrade or hardware upgrade for the existing display apparatus.

In addition, the methods according to the various embodiments in the disclosure described above may be performed through an embedded server provided in the display apparatus or an external server of the display apparatus.

Meanwhile, the controlling method of the display apparatus according to the embodiments described above may be implemented as a program and provided to the display apparatus. Particularly, a program including the controlling method of the display apparatus may be stored and provided in a non-transitory computer readable medium.

Meanwhile, a non-transitory computer readable recording medium may store a computer instruction allowing a display apparatus 100 to perform an operation when executed by a processor of the display apparatus 100 according to an embodiment in the disclosure, wherein the operation may include: controlling the display to display a content; identifying a user interest object in the content displayed on the display 110 based on a user image captured by a camera; and identifying a user preference for the content based on a degree of similarity between information on emotion of the user interest object and information on user emotion.

In addition, the various embodiments in the disclosure described above may be implemented in a recording medium readable by a computer or a device similar to the computer using software, hardware or a combination thereof. According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or electrical units for performing other functions. In some cases, the embodiments described in the disclosure may be implemented as the processor 120 itself. According to a software implementation, the embodiments described in the disclosure such as the procedures and functions may be implemented by separate software modules. Each of the software modules may perform one or more functions and operations described in the disclosure.

Meanwhile, computer instructions for performing processing operations of the display apparatus according to the various embodiment in the disclosure described above may be stored in a non-transitory computer-readable medium. The computer instructions stored in the non-transitory computer readable medium may allow a specific device to perform the processing operations in the display apparatus according to the various embodiments described above when executed by a processor of the specific device.

The non-transitory computer readable medium is not a medium that temporarily stores data therein, such as a register, a cache, a memory or the like, but semi-permanently stores data therein and is readable by the device. A specific example of the non-transitory computer readable medium may be a compact disk (CD), a digital versatile disk (DVD), a hard disk, a Blu-ray disk, a universal serial bus (USB), a memory card, a read only memory (ROM) or the like.

Although embodiments in the disclosure have been illustrated and described hereinabove, the disclosure is not limited to the abovementioned specific embodiments, but may be variously modified by those skilled in the art to which the disclosure pertains without departing from the gist in the disclosure as disclosed in the accompanying claims. These modifications should also be understood to fall within the scope and spirit in the disclosure.

What is claimed is:

1. A display apparatus comprising:
a camera;
a display; and
a processor configured to:
control the display to display content;
identify a person or character in the content displayed on the display based on a user image captured by the camera;
identify a place in the content displayed on the display based on the user image captured by the camera;
identify goods in the content displayed on the display based on the user image captured by the camera;
recognize a user emotion related to the identified person or character, the identified place, and the identified goods in the content;
recognize an emotion of the person or character in the displayed content;
determine a degree of similarity between the recognized emotion of the person or character and the recognized user emotion; and
determine a user preference for the identified person or character, the identified place, and the identified goods in the content, based on the recognized user emotion.

2. The display apparatus as claimed in claim 1, wherein the processor is further configured to:
identify the user preference for the person or character based on the degree of similarity between the recognized emotion of the person or character and the recognized user emotion, and
identify the user preference for at least one of the content or a content type corresponding to the content based on the user preference for the person or character,
wherein the person or character in the content is a user interest object.

3. The display apparatus as claimed in claim 2, wherein the processor is further configured to:
identify the content as a plurality of content sections, and the person or character for each of the plurality of content sections, and
identify the user preference for the content based on the degree of similarity between the recognized emotion of the identified person or character for each content section and the recognized user emotion for each content section.

4. The display apparatus as claimed in claim 1, wherein the processor is further configured to:
identify the user preference for the content based on a first degree of similarity based on identifying that the recognized emotion of the person or character and the recognized user emotion are identical or similar to each other, and a second degree of similarity based on identifying that the recognized user emotion is a reaction emotion.

5. The display apparatus as claimed in claim 1, wherein the processor is further configured to identify the person or character in the content displayed on the display based on at least one of: a context of the display apparatus or a context of the user.

6. The display apparatus as claimed in claim 1, wherein the processor is further configured to:
identify a user degree of sympathy for at least one of the content or the person or character based on the degree of similarity between the recognized emotion of the person or character and the recognized user emotion, and
identify the user preference for the content based on the identified user degree of sympathy.

7. The display apparatus as claimed in claim 1, wherein the processor is further configured to identify the person or character in the content displayed on the display based on at least one of the user's gaze information, the user's biometric information or the user's voice information.

8. The display apparatus as claimed in claim 2, wherein the processor is further configured to provide supplemental content including at least one of advertisement content, recommendation content or summary content based on the user preference for the content.

9. The display apparatus as claimed in claim 1, wherein the processor is further configured to:
identify a first person or character and a second person or character based on a first user and a second user being identified in user images captured by the camera, respectively, and
identify first and second user preferences for the content based on first and second degrees of similarity between recognized emotions of the first person or character and the second person or character and recognized first and second user emotions, respectively.

10. The display apparatus as claimed in claim 1, wherein the processor is further configured to:
based on a plurality of persons or characters being identified in the content displayed on the display, identify additional information on which the user's gaze is focused in the content displayed on the display based on the user image, and
identify one of the plurality of persons or characters based on the identified additional information, and
the additional information is information on each of the plurality of persons or characters.

11. A controlling method of a display apparatus comprising:
controlling a display to display content;
identifying a person or character in the content displayed on the display based on a user image captured by a camera;
identifying a place in the content displayed on the display based on the user image captured by the camera;

identifying goods in the content displayed on the display based on the user image captured by the camera;

recognizing a user emotion related to the identified person or character, the identified place, and the identified goods in the content;

recognizing an emotion of the person or character in the displayed content;

determining a degree of similarity between the recognized emotion of the person or character and the recognized user emotion; and determining a user preference for the identified person or character, the identified place, and the identified goods in the content, based on the recognized user emotion.

12. The controlling method as claimed in claim 11, further comprising: identifying the user preference for the person or character based on the degree of similarity between the recognized emotion of the person or character and the recognized user emotion; and identifying the user preference for at least one of the content or a content type corresponding to the content based on the user preference for the person or character, wherein the person or character in the content is a user interest object.

13. The controlling method as claimed in claim 12, wherein the identifying of the user preference for the content includes:

identifying the content as a plurality of content sections, and the person or character for each of the plurality of content sections; and identifying the user preference for the content based on the degree of similarity between the recognized emotion of the person or character identified for each content section and the recognized user emotion corresponding to the each content section.

14. The controlling method as claimed in claim 11, further comprising: identifying a user preference for the content based on a first degree of similarity based on identifying that the recognized emotion of the person or character and the recognized user emotion are identical or similar to each other; and identifying the user preference for the content based on a second degree of similarity based on identifying that the recognized user emotion is a reaction emotion.

15. The controlling method as claimed in claim 11, wherein the identifying of the person or character in the content includes identifying the person or character in the content displayed on the display based on at least one of: a context of the display apparatus or a context of the user.

16. The controlling method as claimed in claim 11, further comprising:

identifying a user degree of sympathy for at least one of the content or the person or character based on the degree of similarity between the recognized emotion of the person or character and the recognized user emotion; and identifying a user preference for the content based on the identified user degree of sympathy.

17. The controlling method as claimed in claim 11, wherein the identifying of the person or character in the content includes identifying the person or character in the content displayed on the display based on at least one of the user's gaze information, the user's biometric information or the user's voice information.

18. The controlling method as claimed in claim 12, further comprising providing supplemental content including at least one of advertisement content, recommendation content or summary content based on the user preference for the content.

19. A non-transitory computer readable medium storing one or more computer instructions that, when executed by a processor, cause the processor to:

control a display to display content;

identify a person or character in the content displayed on the display based on a user image captured by a camera;

identify a place in the content displayed on the display based on the user image captured by the camera;

identify goods in the content displayed on the display based on the user image captured by the camera;

recognize a user emotion related to the identified person or character, the identified place, and the identified goods in the content;

recognize an emotion of the person or character in the displayed content;

determine a degree of similarity between the recognized emotion of the person or character and the recognized user emotion, and determine a user preference for the identified person or character, the identified place, and the identified goods in the content, based on the recognized user emotion.

20. A display apparatus comprising:

a camera;

a display; and a processor configured to:

control the display to display content;

control the camera to capture an image;

identify a place in the content displayed on the display based on the captured image;

identify goods in the content displayed on the display based on the captured image;

recognize, based on the captured image, a gazing point of a user, which is a point on the display that the user is gazing at;

recognize an emotion of a person or character located at the point on the display that the user is gazing at;

recognize a user emotion related to an identified person or character, the identified place, and the identified goods in the content;

determine a degree of similarity between the recognized emotion of the person or character and the recognized user emotion, and determine a user preference for the identified person or character, the identified place, and the identified goods in the content, based on the recognized user emotion.

* * * * *